US012746641B2

(12) United States Patent
Ojalehto

(10) Patent No.: US 12,746,641 B2
(45) Date of Patent: Sep. 29, 2026

(54) FLUID-PRESSURE ROTARY ACTUATOR FOR CLAMPING SYSTEMS

(71) Applicant: Rapid Design Solutions, LLC, Spirit Lake, ID (US)

(72) Inventor: Troy William Ojalehto, Priest River, ID (US)

(73) Assignee: Rapid Design Solutions, LLC, Spirit Lake, ID (US)

( * ) Notice: Subject to any disclaimer, the term of this patent is extended or adjusted under 35 U.S.C. 154(b) by 369 days.

(21) Appl. No.: 18/599,281

(22) Filed: Mar. 8, 2024

(65) Prior Publication Data

US 2025/0187146 A1 Jun. 12, 2025

Related U.S. Application Data

(60) Provisional application No. 63/608,843, filed on Dec. 12, 2023.

(51) Int. Cl.

*B25B 1/18* (2006.01)
*B25B 1/00* (2006.01)
*B25B 1/02* (2006.01)
*B25B 1/06* (2006.01)
*B25B 1/10* (2006.01)
*F03C 1/053* (2006.01)

(52) U.S. Cl.

CPC .................. *B25B 1/18* (2013.01); *B25B 1/02* (2013.01); *B25B 1/06* (2013.01); *B25B 1/103* (2013.01); *F03C 1/0531* (2013.01)

(58) Field of Classification Search

CPC ............. B25B 1/18; B25B 1/103; B25B 1/06; B25B 1/02; F03C 1/0531; F03C 1/0409; F15B 15/065

See application file for complete search history.

(56) References Cited

U.S. PATENT DOCUMENTS 2,709,422 A 5/1955 Bray
4,066,002 A * 1/1978 Eastman ............... F01B 1/0658 91/36
4,498,032 A 2/1985 Pinson
2002/0185800 A1* 12/2002 Duncan .................. B25B 1/103 269/242

FOREIGN PATENT DOCUMENTS

DE 202004004636 U1 5/2004

OTHER PUBLICATIONS

High Torque Vise Actuator Found at: https://www.youtube.com/watch?v=II5z3LDIxG8&t=11s (Year: 2023).*
CNC_Vise_Actuator_Datasheet-Rapid_Design (Year: 2019).*
Improved Work Bench And Clamping Device For A Work Bench Top; Document ID: EP 0214785 A1; Date Published: Mar. 18, 1987; Inventor: Yang Tai-Her (Year: 1987).*
"International Search Report and Written Opinion", International Application No. PCT/US2024/051499, Jan. 29, 2025, 10 pages.

* cited by examiner

*Primary Examiner* — Mahdi H Nejad
(74) *Attorney, Agent, or Firm* — FIG. 1 Patents

(57) ABSTRACT

This document discloses an improved fluid-pressure rotary actuator. The described rotary actuator is especially useful for opening and closing milling machine vises, or fixtures, in a power-dense configuration. In this way, the described rotary actuator delivers a high actuation torque and infinite rotation, which is especially useful for programmable opening and closing of milling machine vises over a wide travel range.

20 Claims, 24 Drawing Sheets

FLUID-PRESSURE ROTARY ACTUATOR FOR CLAMPING SYSTEMS

RELATED APPLICATION

This application claims priority under 35 U.S.C. § 119(e) to U.S. Provisional Patent Application No. 63/608,843, filed Dec. 12, 2023, and titled "Fluid Pressure Rotary Actuator for Clamping and Unclamping of Milling Machine Vises," the entire disclosure of which is hereby incorporated by reference.

BACKGROUND

When using equipment (e.g., a robot) to replace a human operator and automate manufacturing processes (e.g., the operation of a computer numerical control (CNC) milling machine), it may be necessary to develop systems and techniques for clamping and unclamping associated vises or clamping fixtures. Many manufacturing processes present numerous clamping difficulties. For example, a large amount of clamping torque is required in CNC milling machine applications to prevent a workpiece from moving inside the vise. In other automated manufacturing processes, a large vise jaw travel is required to grip and un-grip parts with irregular profiles or dovetail-shaped features. A large vise jaw travel is often required for dual-moving jaw vises in which two parts are gripped simultaneously.

DETAILED DESCRIPTION

Figure 1A:
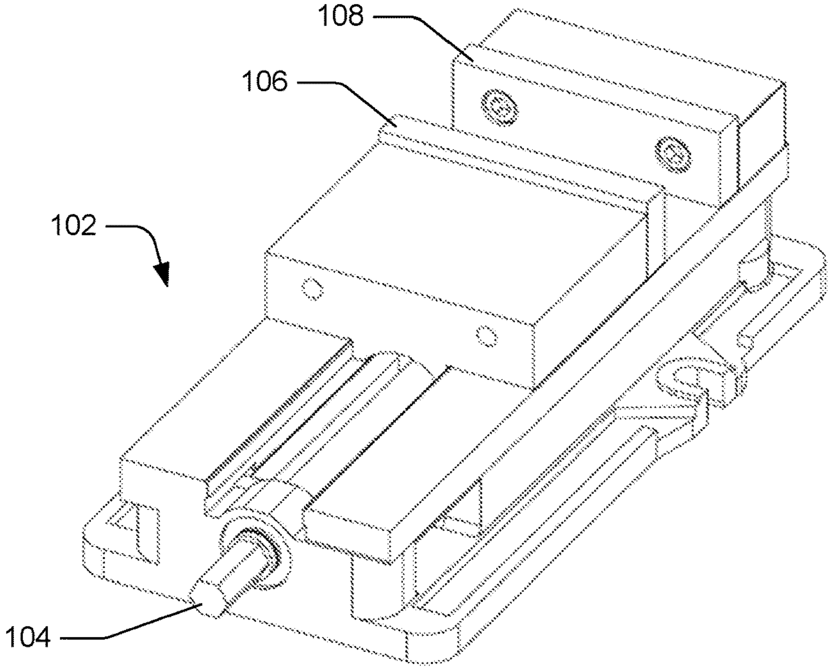
FIGS. 1A through 1C illustrate a non-limiting example of a rotary actuator and a vise for providing fluid-pressure rotary actuation for clamping systems in automated machining processes.

As described above, the automation of manufacturing processes generally requires automated or controllable clamping fixtures. Some clamping systems suitable for the automatic operation of CNC milling machines utilize pneumatic pistons that operate on the clamping axis of the vise. Such clamping techniques require a large amount of pneumatic piston surface area to generate sufficient clamping force, often exceeding 2500 pounds. Adequate piston surface area is generally obtained with a single large piston or multiple smaller pistons stacked axially. Either approach disadvantageously requires much space inside a milling machine, which is generally limited.

Other clamping systems address the need for a large piston surface area by utilizing a high-pressure fluid (e.g., hydraulic or pneumatic pressure) to actuate the clamping fixture. Commonly available air pressure has a maximum pressure of around 180 pounds per square inch (psi). Such systems require a hydraulic pump and control valves to actuate the clamp and unclamping features. A hydraulic pump system, however, is not commonly installed on milling machines, necessitating the purchase of an auxiliary pump and control valves at often a high expense.

Pneumatic and hydraulic clamping systems must also be double-acting or have a spring return (e.g., spring clamp). For double-acting systems, clamping pressure cannot be maintained in the event of a pneumatic or hydraulic pressure failure, resulting in the workpiece being released from the vise, creating a safety problem, and potentially causing costly damage. For spring clamps where hydraulic or pneumatic pressure is used to release the vise, a loss of system pressure leads to the vise not releasing or unclamping the workpiece. The failure to release a workpiece raises a new problem in which the applied clamping force is difficult to set and control, making it difficult to hold delicate workpieces.

Pneumatic and hydraulic clamping systems also generally have a limited actuation range, which often requires manual adjustment between different workpieces with considerable clamping width variance. Some clamping systems address this issue by utilizing electric motors to spin a lead screw, but electric motor systems are costly and generally not as simple to control or power-dense as pneumatics. In addition, pneumatic and hydraulic clamping systems often necessitate costly vise fixtures designed specifically for a particular manufacturing process.

In contrast, the described fluid-pressure rotary actuator provides cost-effective and efficient systems and techniques for clamping systems. In particular, the described rotary actuator takes advantage of the fact that manual clamping fixtures with hand-operated lead screws are ubiquitous in manufacturing processes. As a result, these existing clamping systems can be retrofitted with the described rotary actuator at a low cost and minimal time investment. The described rotary actuator supports high-torque applications by introducing a large amount of torque output per pressure unit input with a power-dense stacked piston design. In addition, commonly available "shop" air pressure (e.g., around 100 psi) combines the stacked piston design and a cam rotor mechanism to create sufficient clamping force. The described rotary actuator integrates into a milling machine or other equipment using readily available and cost-effective pneumatic valves.

The described rotary actuator can be controlled by programming a robot or controller to clamp and unclamp a workpiece in an automated manner, facilitating complete automation of a manufacturing process and eliminating the need for a human operator. Because it allows infinite rotation of the vise lead screw, the opening distance of a vise is not limited by the actuator. The described rotary actuator also enables automatic clamping and unclamping of vise fixtures, with feedback to verify that the intended state was achieved.

Example Implementation with a Vise

Figure 1B:
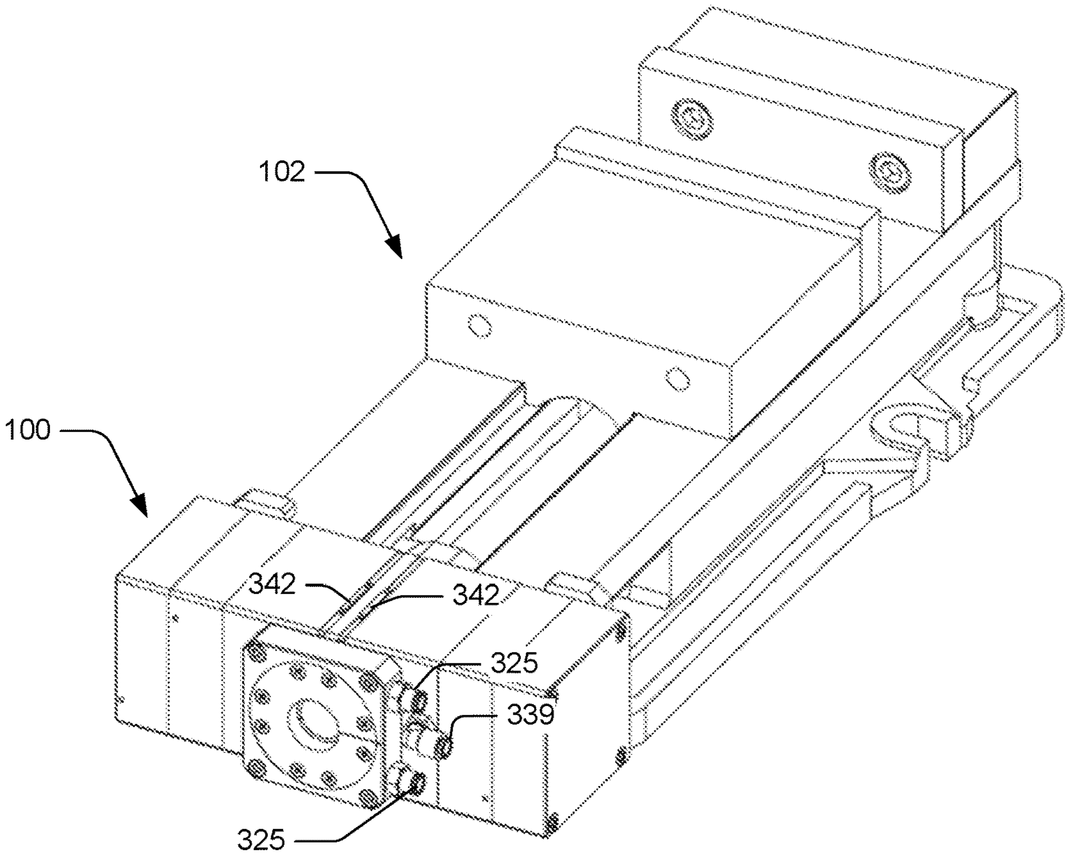
Figure 1C:
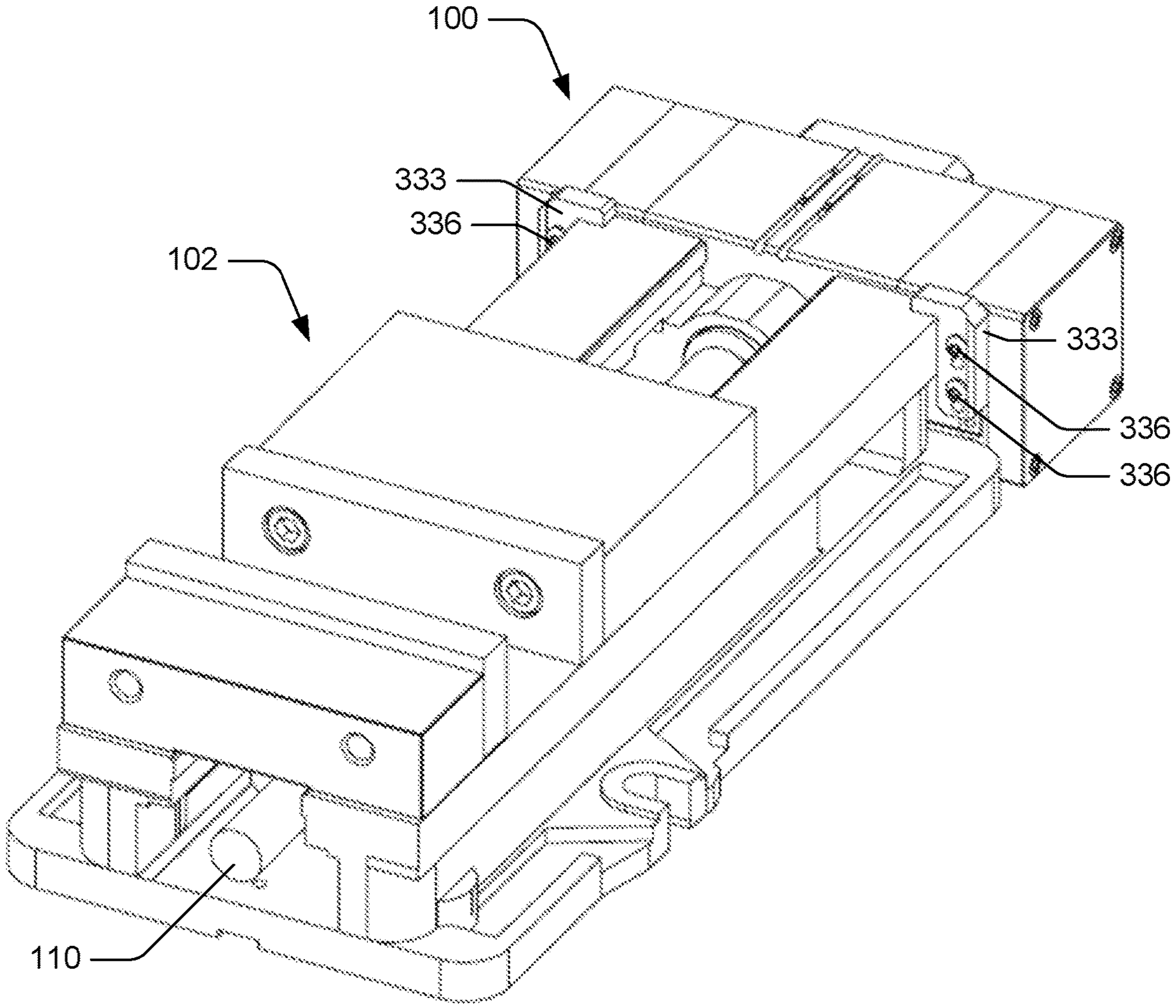

FIGS. 1A through 1C illustrate a non-limiting example of a rotary actuator 100 and a vise 102 for providing fluid-pressure rotary actuation for clamping systems in automated machining processes. Specifically, the rotary actuator 100 is integrated with the vise 102 of a CNC milling machine to provide the described clamping systems and techniques. In other implementations, the rotary actuator 100 is used for automated clamping and unclamping of other rotary actuated fixtures or processes and is not limited to milling machine vises.

In FIG. 1A, the vise 102 illustrates a clamping system commonly used inside or on a CNC milling machine. The vise 102 includes a hexagonal end 104 to its lead screw 110 (not illustrated in FIG. 1A), a sliding jaw 106, and a stationary jaw 108. In general, the lead screw 110 is rotated via the hexagonal end 104 to move the sliding jaw 106 along a clamping axis. For example, the lead screw is rotated clockwise to move the sliding jaw 106 toward the stationary jaw 108 and apply a clamping force on an object (not illustrated in FIG. 1A) located therebetween.

In FIGS. 1B and 1C, the described rotary actuator 100 is integrated with the vise 102. The rotary actuator 100 is installed or slid onto the front of the vise 102 onto the hexagonal end 104. A hex adapter (later illustrated as element 310) engages the hexagonal end 104 of the lead screw 110. Generally, rotary actuator 100 is slid along the hexagonal end 104 toward the vise 102 until its back face contacts the front face of the vise 102 and one or more ring magnets (later illustrated as elements 334) engage with the front face of the vise 102. The ring magnets hold the rotary actuator in place along the lead screw's direction.

One or more screws 336 that secure one or more corner blocks 333 are loosened. In the illustrated example, two corner blocks 333 are slid down until their L-shaped protrusions contact the top surface of the vise bed. In other implementations, the shape of the two corner blocks 333 is configured to match the outer shape of the vise bed. The screws 336 are then tightened to hold the two corner blocks 333 in place, fixing the rotary actuator 100 to the vise 102. The hexagonal end 104 holds the rotary actuator 100 in place in the up-down and left-right axes (e.g., directions perpendicular to the lead screw 110), while the ring magnets hold it in place in the front-back axis (e.g., along or parallel to the lead screw 110). The corner blocks 333 hold the rotary actuator 100 in place to prevent clockwise or counterclockwise rotation when the rotary actuator 100 applies rotary movement and torque to the lead screw 110.

Tubing (e.g., flexible tubing) is connected to fluid fittings 325 installed in ports (later illustrated as port 374 and port 375) of the rotary actuator 100. These tubes may then be connected to a fluid valve outside the milling machine, which may be controlled by a programmable logic controller (PLC), processor, computer system, or other robotic mechanism. The valve may be in the 5/3 open center configuration connected to both a high pressure (e.g., 100 psi, but as low as 15 psi) and low pressure (e.g., atmospheric pressure), with the ability to apply the high or low pressure to either of the two tubes. Tubing (e.g., flexible tubing) is also connected to a fluid fitting 339 routed to an open location and vented to atmospheric pressure (e.g., outside the CNC milling machine). Electrical cables may connect one or more magnetic sensors 342 to an external PLC or robot.

An operator or PLC activates the fluid valve to apply pressure to one of the tubing lines (connected to the fluid fittings 325), causing the rotary actuator 100 to spin a cam rotor. Spinning of the cam rotor rotates the lead screw 110 of the vise 102 and causes the sliding jaw 106 to move. In other implementations, the vise 102 includes two sliding jaws 106, and the cam rotor causes the two sliding jaws 106 to move toward or away from one another. In one implementation, the fluid valve is actuated until the sliding jaw 106 (or sliding jaws 106) reaches a fully closed position, providing a zero or null location for a PLC counter that monitors the magnetic sensors 342.

With the rotary actuator 100 installed and set up on the vise 102, a programmed PLC instructs the vise 102 to open (e.g., to 3.1 inches wide), which it does by applying high pressure to the correct tubing line. The PLC monitors the magnetic sensors 342 to determine when the cam rotor has rotated a sufficient number of turns to open the vise jaws to the desired position based on the thread pitch of the lead screw 110. In one example implementation, the PLC or another controller is programmed to instruct a robot to load a three-inch-wide workpiece between the vise jaws. By applying high pressure to the correct tubing line (e.g., the other tubing line), the PLC causes the rotary actuator 100 to rotate the vise's lead screw 110 until the workpiece is clamped securely between the sliding jaw 106 and the stationary jaw 108. The clamping force is set by adjusting the pressure applied to the rotary actuator 100. The applied pressure is approximately linear to the torque output by the rotary actuator 100.

The PLC can programmatically verify that the vise 102 has closed the correct amount to securely clamp on the workpiece by monitoring the rotational position of the vises lead screw 110 via the magnetic sensors 342. The PLC or another controller then instructs the CNC milling machine to machine the workpiece.

Now consider if the next workpiece to be loaded into the CNC milling machine is four inches wide (or some other dimension different than that of the previous workpiece). The PLC programmatically instructs the rotary actuator 100 to open the vise 102 to 4.1 inches and use the robot to load this wider workpiece, clamp the vise down to four inches, and verify the part is clamped, all without the need for human intervention before the CNC milling machine operates on the next workpiece. In this manner, the described rotary actuator 100 enables automated processing of various-sized workpieces using a PLC, robot, and CNC milling machine (e.g., in a high mix/low volume production environment). In addition, after the rotary actuator 100 causes the vise 102 to clamp, a loss of air pressure or electrical power does not cause the vise 102 to unclamp; otherwise, the workpiece may possibly be ejected in a dangerous fashion.

Figure 2:
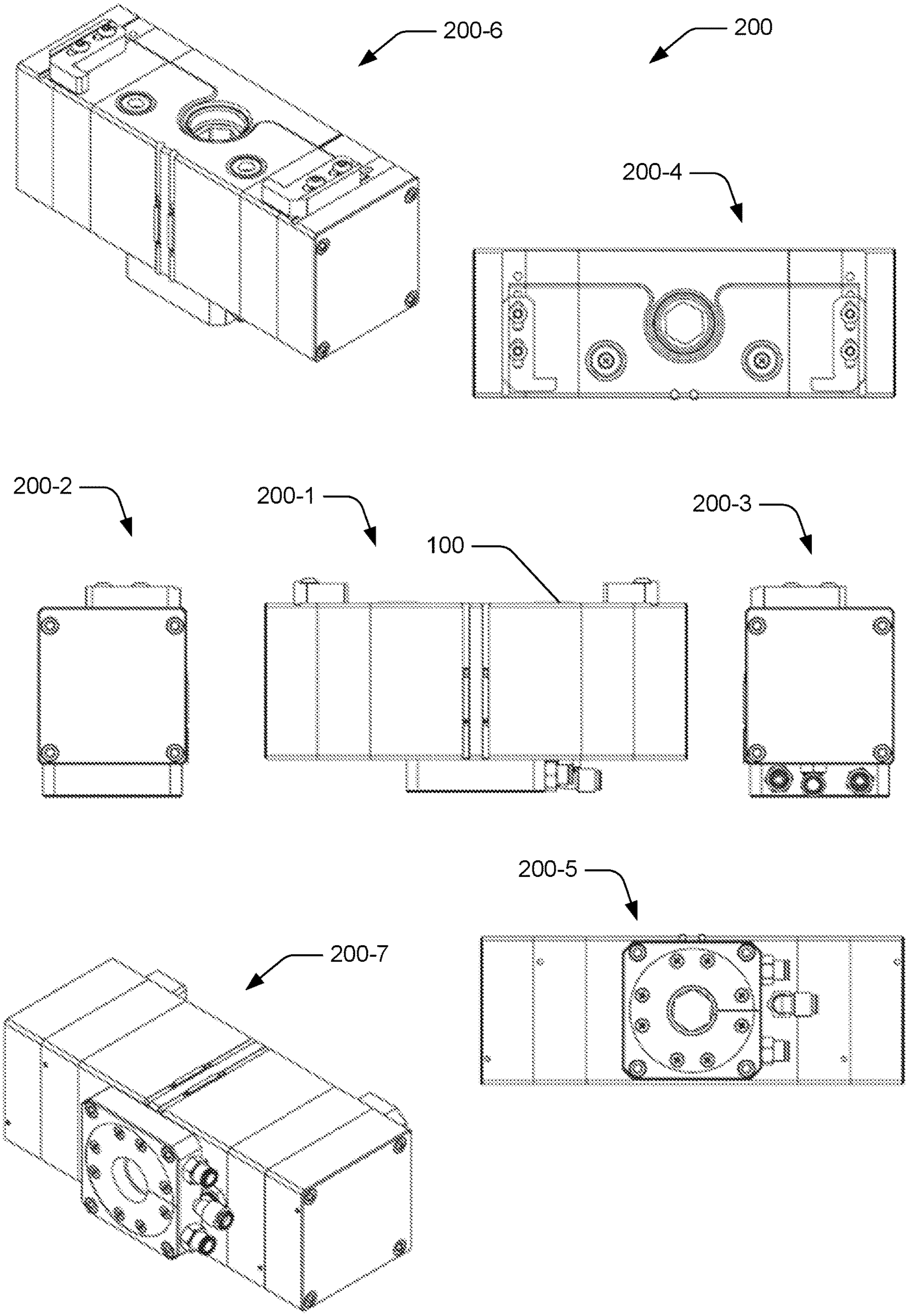
FIG. 2 illustrates various views of a non-limiting example of the rotary actuator to provide fluid-pressure rotary actuation for clamping systems in automated machining processes.

FIG. 2 illustrates various views 200 of a non-limiting example of the rotary actuator 100 to provide fluid-pressure rotary actuation for clamping systems in automated machining processes. Views 200-1, 200-2, and 200-3 illustrate a top view, left-side view, and right-side view, respectively, of the rotary actuator 100. View 200-4 illustrates a back view, showing the face of the rotary actuator 100, which is positioned adjacent to or abutting the vise 102. View 200-5 illustrates a front view. Views 200-6 and 200-7 illustrate a back-top-right isometric view and front-top-right isometric view, respectively, of the rotary actuator 100.

Example Components

Figure 3:
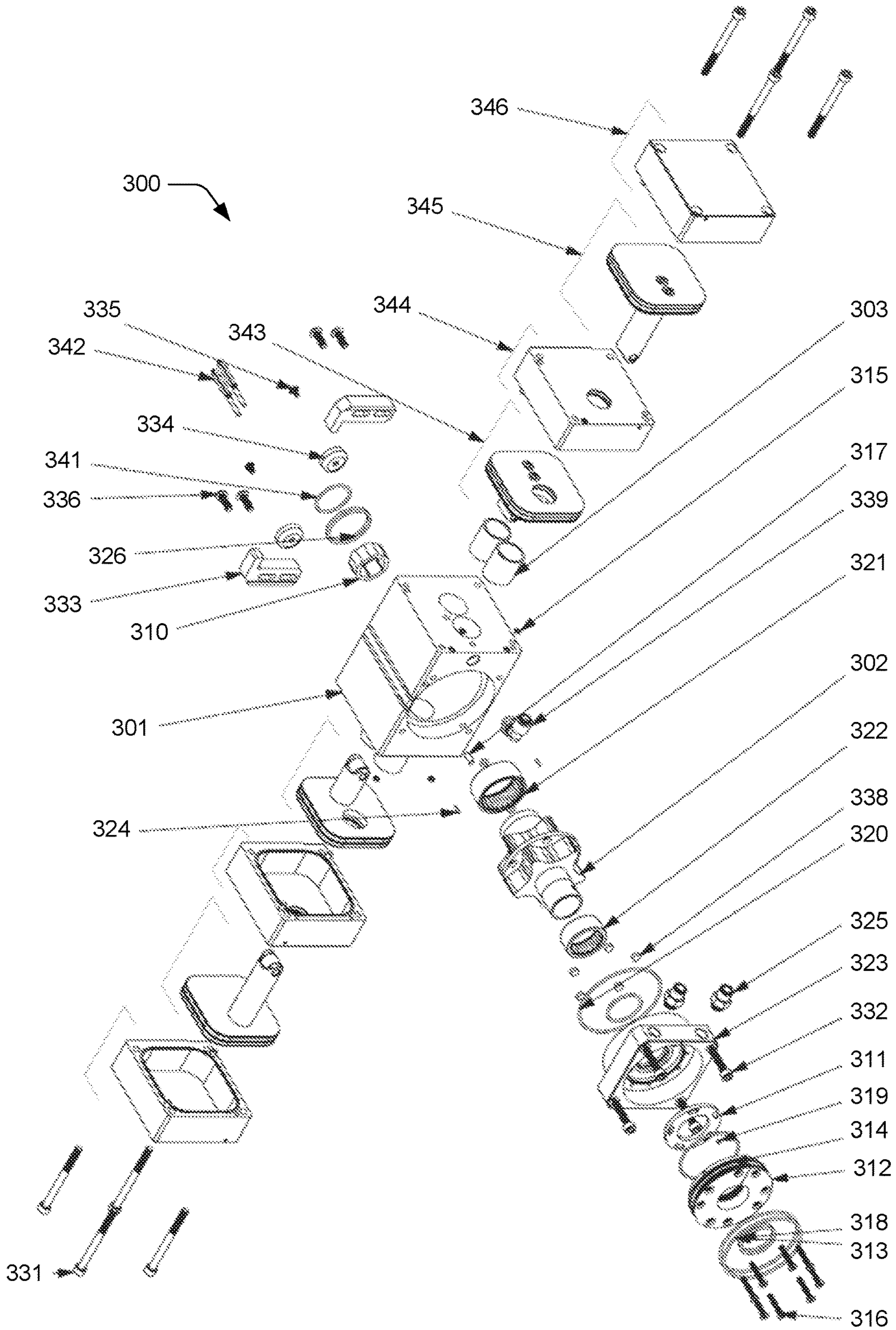
FIG. 3 illustrates an exploded view of the components in a non-limiting example of the rotary actuator.

FIG. 3 illustrates an exploded view 300 of the components in a non-limiting example of the rotary actuator 100. The rotary actuator 100 includes a body assembly, a cam rotor assembly, and multiple stacked-piston assemblies. In other implementations, the rotary actuator 100 may include fewer or additional components or a different quantity of individual components. More detailed views of the components of the rotary actuator 100 are illustrated in FIGS. 4 through 17.

Body Assembly

Figure 4:
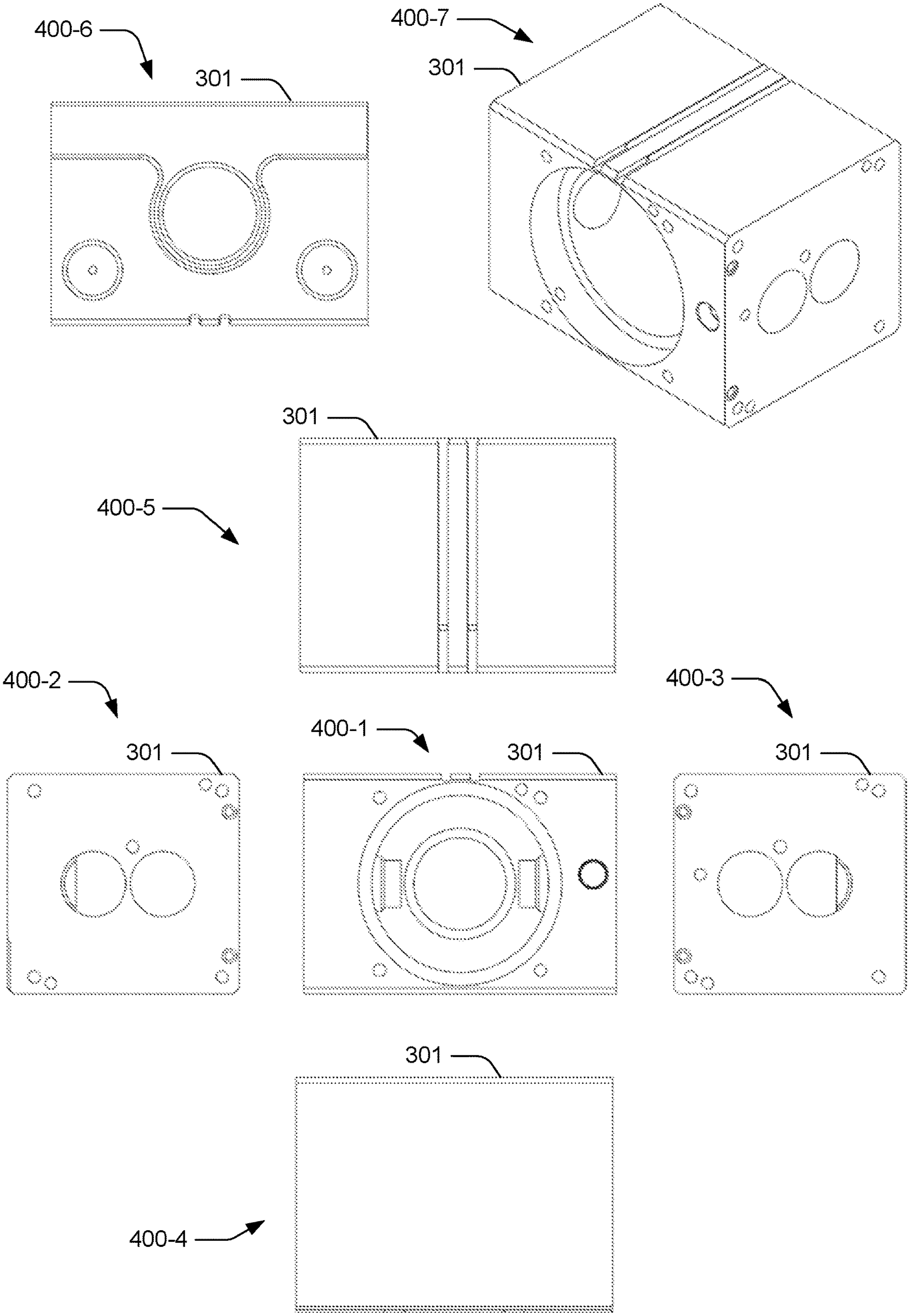
FIG. 4 illustrates various views of a non-limiting example of a body of the rotary actuator.

The body assembly includes a body 301 that provides a central housing for the rotary actuator 100. FIG. 4 illustrates various views 400 of a non-limiting example of the body 301 for the rotary actuator 100. In particular, views 400-1, 400-2, 400-3, 400-4, 400-5, and 400-6 illustrate a front, left side, right side, bottom, top, and back view, respectively, of the body 301. View 400-7 illustrates an isometric view of the body 301.

As illustrated in view 400-7, the body 301 has a cuboidal shape and is made of metal (e.g., aluminum). The front surface (see view 400-1) includes several counterbored holes with a through hole concentric to the counterbored face holes, which may collectively be referred to as the "front-surface through hole." In the illustrated implementation, the front-surface through hole includes one or more annular grooves to house o-rings for sealing. The front surface also includes a threaded hole that connects to a through hole in one of the end surfaces. A fluid fitting 339 enables the connection of a pneumatic airline and is inserted into the threaded hole of the front surface. The fluid fitting 339 has a perpendicular or elbow shape. The front surface also includes four threaded holes.

O-rings 326 are round donut-shaped bodies to seal between surfaces in the rotary actuator 100 and are made from rubber or similar material. Their size is configured to interfere slightly with the plurality of surfaces to be sealed. In the illustrated implementation of FIG. 3, the rotary actuator 100 includes two o-rings 326 to fit within the two annular grooves in the front-surface through hole and form a seal between the body 301 and the cylindrical outer boss surface of the cam rotor 302, forming a redundant seal. A retaining ring 341, which is a flexible metal or composite ring, is also inserted into the front-surface through hole from the back surface of the body 301.

The left-end and right-end surfaces (see views 400-2 and 400-3) of body 301 each include two end holes to the front-surface through hole. Inside each end hole is a sleeve bearing 303 having a hollow cylindrical body. The sleeve bearings 303 are generally made of oil-impregnated copper bronze or other friction-reducing metal. The curved ends of the sleeve bearings 303 face inward and are oriented to be concentric with the inner counterbore of the body 301. The end surfaces also include multiple tapped holes and multiple air passage holes that connect each end surface to the front-surface through hole.

The top surface (see view 400-5) includes multiple two C-shaped grooves parallel with the axis of the front-surface through hole. A magnetic sensor 342 is situated in each C-shaped groove. The magnetics sensors 342 are sensors or switches that activate an electrical output or circuit when a sensing medium (e.g., a magnet) is moved into close proximity. In one implementation, the rotary actuator 100 uses two magnetic sensors 342. The magnetic sensors 342 are located at a medial position parallel to the central axis 386 and secured in place with a fixing set screw in each of the magnetic sensors 342. The wires of the magnetic sensors 342 may be terminated at an external automation controller.

The back surface (see view 400-6) includes two counterbored holes with a threaded hole therein. A ring magnet 334, which is a cylindrical magnet with a countersunk hole through its center, is inserted into each counterbored hole and attached using a screw 335. The ring magnets 334 attach to the vise 102 and prevent movement of the rotary actuator 100 along the lead-screw axis. The screw 335 is a metal pan-head type screw. The rotary actuator 100 uses one screw 335 to attach each of two ring magnets 334 to the back surface of the body 301 within the counterbored holes. In other implementations, the counterbored holes, ring magnets 334, and screws 335 are shaped and sized based on each other.

A hex adapter 310 is inserted in the front-surface through hole of the body 301 from the back surface. The hex adapter 310 is hexagonally shaped with a hexagon-shaped hole extending through its center axis parallel to the outer hexagonal shape. The hex adapter 310 is sized and shaped to contour to the hexagonal end 104 (or other end) of a lead screw 110 of a vise to be actuated. The hex adapter 310 is made of metal (e.g., steel). The hex adapter 310 is located inside the hex-shaped hole in the flat end face of the cam rotor 302 and secured in place axially by a retaining ring 341, which fits into the internal groove inside the end hole of the cam rotor 302.

Multiple corner blocks 333 attach to the back surface of the body 301 to prevent rotation of the rotary actuator 100 upon installation on the vise 102. The corner blocks 333 have a rectangular block shape with a short L-like protrusion that is shaped and configured to abut a surface of the vise 102. Each corner block 333 includes two through slots and two rib protrusions in a vertical direction. A first corner block 333 is located with its protruding rib into the straight face slot of a first outer chamber housing assembly 346 with the short side of its L-shape pointing towards body 301. Two screws 336 pass through two slots in the corner block 333 and locate inside two of the threaded holes in the first outer chamber housing assembly 346. A second corner block 333 is located with its protruding rib into the straight face slot of a second outer chamber housing assembly 346 with the short side of its L-shape pointing towards body 301. Two screws 336 pass through two slots in the second corner block 333 and locate inside two of the threaded holes in the second outer chamber housing assembly 346. The screws 336 are generally metal screws with a socket-head cap. The rib protrusions assist in aligning each corner block 333 to the back surface of the body 301. The corner blocks 333 are made of metal (e.g., steel).

Cam Rotor Assembly

Figure 5:
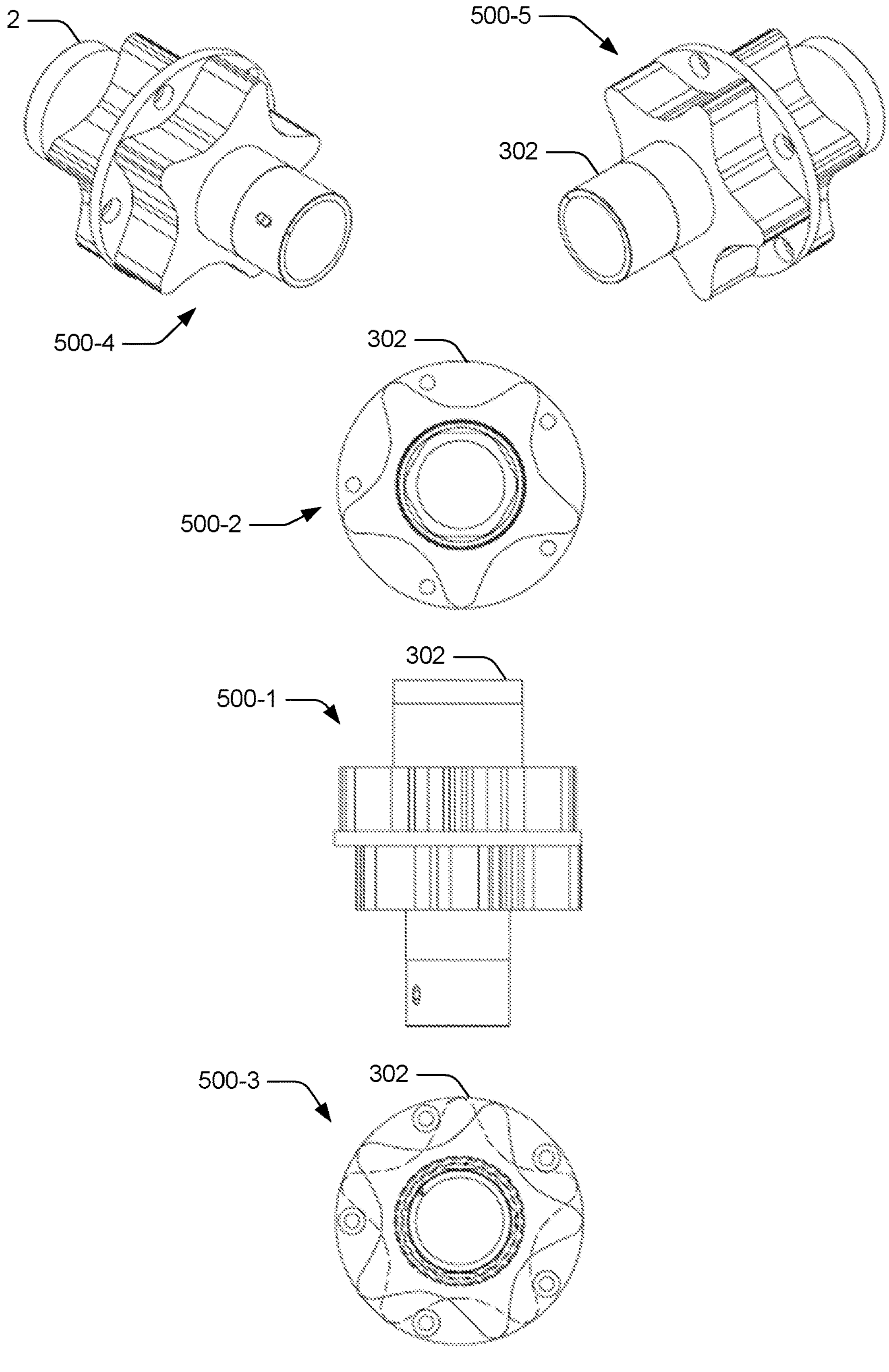
FIG. 5 illustrates various views of a non-limiting example of a cam rotor of the rotary actuator.

The cam rotor assembly includes a cam rotor 302, which is a cylindrical body generally made of metal. FIG. 5 illustrates various views 500 of a non-limiting example of the cam rotor 302. In particular, views 500-1, 500-2, and 500-3 provide a top view, back view, and front view, respectively, of the cam rotor 302. Views 500-4 and 500-5 provide isometric views of the cam rotor 302. The cam rotor 302 includes smooth circular outer bearing surfaces and cam lobes that protrude diametrically away from the center axis to form first and second star-shaped cam lobe profiles at a rotational offset (e.g., 18-degree offset) to one another. In other implementations, the cam lobe profiles can include a different number of cam lobes (e.g., N cam lobes, with N being a positive and odd integer greater than or equal to three). In such implementations, the rotational offset between the cam lobe profiles equals ninety (90) divided by N.

A needle bearing 321 and needle bearing 322 overlap the outer bearing surfaces of the cam rotor 302. The needle bearings 321 and 322 have a hollow cylindrical-shaped bearing, which may include rolling or sliding elements to reduce friction between concentric cylindrical surfaces. The needle bearing 321 is positioned inside the deepest counterbored hole in the body 301. The cam rotor 302 is positioned inside the body 301 and needle bearing 321 with the center of it forming a central axis 386 (as illustrated in FIG. 14B) and one of the faces of its star-like cam lobe shape adjacent to the near face of the cylindrical needle bearing 321. The needle bearing 322 is positioned concentric to the opposite cylindrical outer bearing surface of the cam rotor 302 and adjacent to the face of its opposite star-like cam lobe shape. The needle bearings 321 and 322 may be made of metal or a composite material.

The cam rotor 302 also includes a hexagonal-shaped hole through the hollow center of the cylindrical body. The center axis of the hole is collinear with the longitudinal center axis of the cylindrical body. A round key-seat channel is included in one of the outer bearing surfaces.

The cam rotor 302 also includes five counter-bored holes centered between the lobes of one of the star-shaped cam lobes in the largest diameter face of the cam rotor 302. A cam magnet 338 is inserted in each of these holes.

Figure 8:
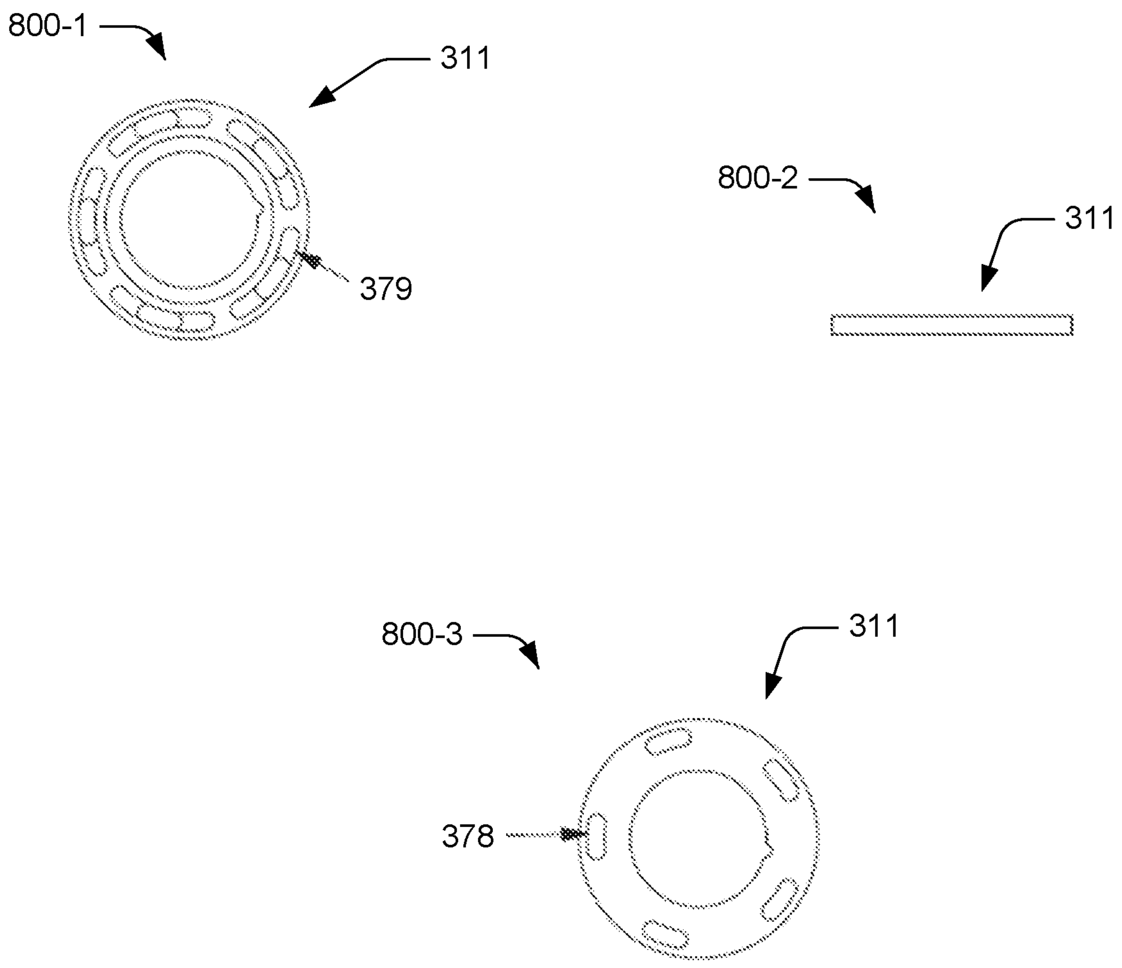
FIG. 8 illustrates various views of a non-limiting example of a distributor wheel of the rotary actuator.

The cam rotor assembly includes a distributor wheel 311 and distributor cap 312. The distributor wheel 311 includes a cylindrical body with five curved slots through its height and concentric to its center axis. FIG. 8 illustrates various views 800 of a non-limiting example of the distributor wheel 311. In particular, views 800-1, 800-2, and 800-3 provide a back view, top view, and front view, respectively. The curved slots are arranged evenly around the center axis. The distributor wheel 311 also includes a center hole with a small key-seat cut in one side of the center hole. The distributor wheel 311 is located concentric to the outer cylindrical boss surface of the cam rotor 302 and its flat face is coincident with the bottom face of the second counterbore in a distributor block 323. The distributor wheel 311 is generally made of metal (e.g., steel). A distributor key pin 319 is located inside the cylindrical hole formed by the two half-circle keyway cuts of the cam rotor 302 and the distributor wheel 311, fixing the rotation of the distributor wheel 311 in relation to the cam rotor 302. The illustrated embodiment of the distributor wheel 311 with the window passages provided by the curved slots enables precise opening and closing of fluid passages without using flexible sliding seals (e.g., o-rings). In particular, the rotary actuator 100 relies on close clearances of metal parts that may include a hard, low-friction coating (e.g., nickel with polytetrafluoroethylene additive) to enable a long-lasting, dynamic dry seal.

Figure 6:
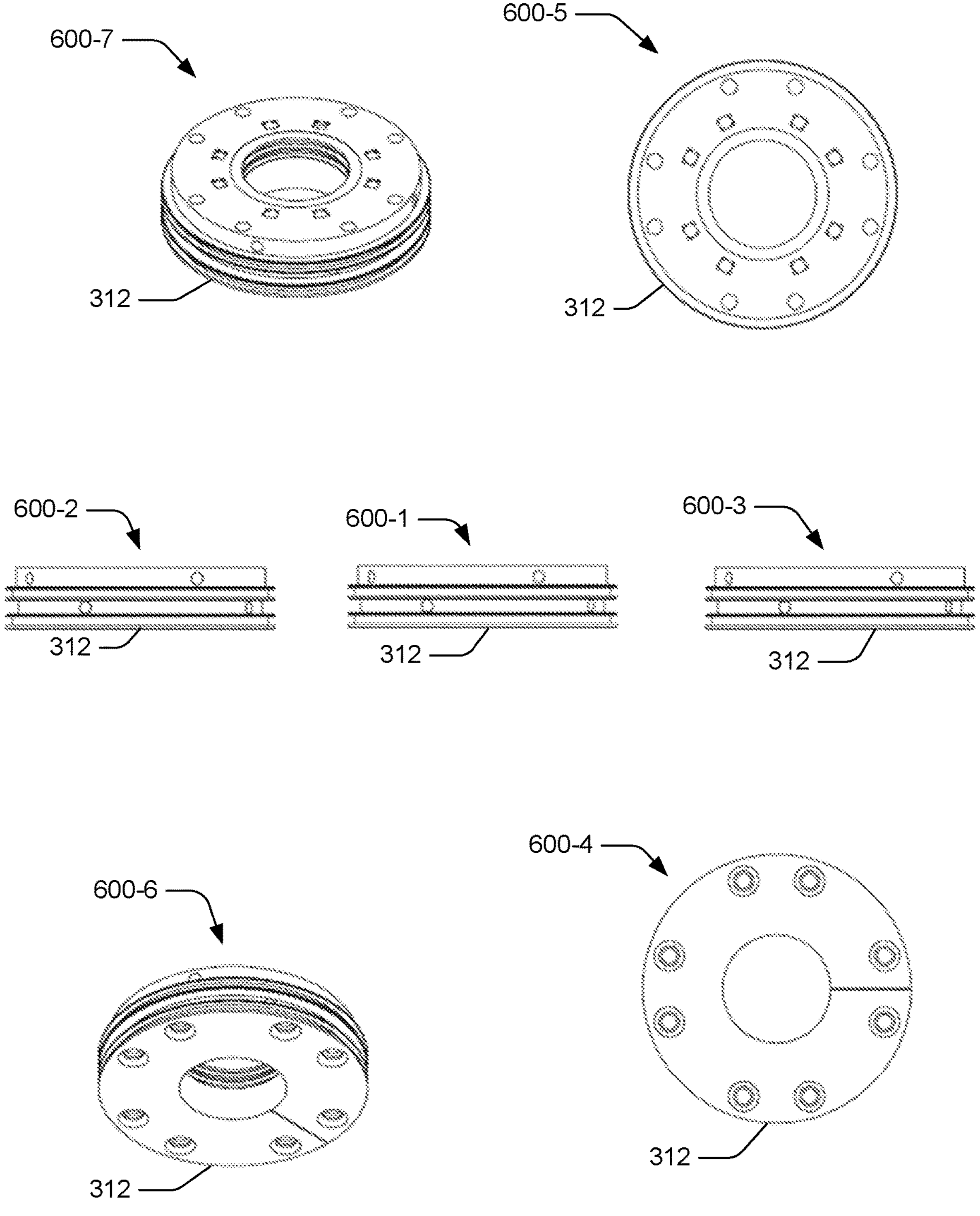
FIG. 6 illustrates various views of a non-limiting example of a distributor cap of the rotary actuator.

The distributor cap 312 includes a cylindrical body with a center through hole and includes two interior annular grooves concentric to the center hole. FIG. 6 illustrates various views 600 of a non-limiting example of the distributor cap 312. In particular, views 600-1, 600-2, 600-3, 600-4, and 600-5 provide a top view, left-side view, right-side view, front view, and back view, respectively. Views 600-6 and 600-7 provide isometric views of the distributor cap 312. The distributor cap 312 is located inside the large outer counterbore of the distributor block 323 concentric to the central axis 386 and with its inner flat face coincident with the bottom flat face of the outer counterbore of the distributor block 323. The outside surface of the cylinder includes four annular grooves, two of which may accept an o-ring seal and two of which may serve as air passages. One face of the cylinder includes screw holes that extend through to its opposite face, in which there are eight additional holes. Four additional holes are connected to one of the outer annular grooves (e.g., in the outer surface of the cylindrical body). The other four additional holes are connected to the other outer annular grooves. The eight additional holes are perpendicular to the outer annular grooves. The distributor cap 312 is generally made from metal (e.g., aluminum).

Figure 7:
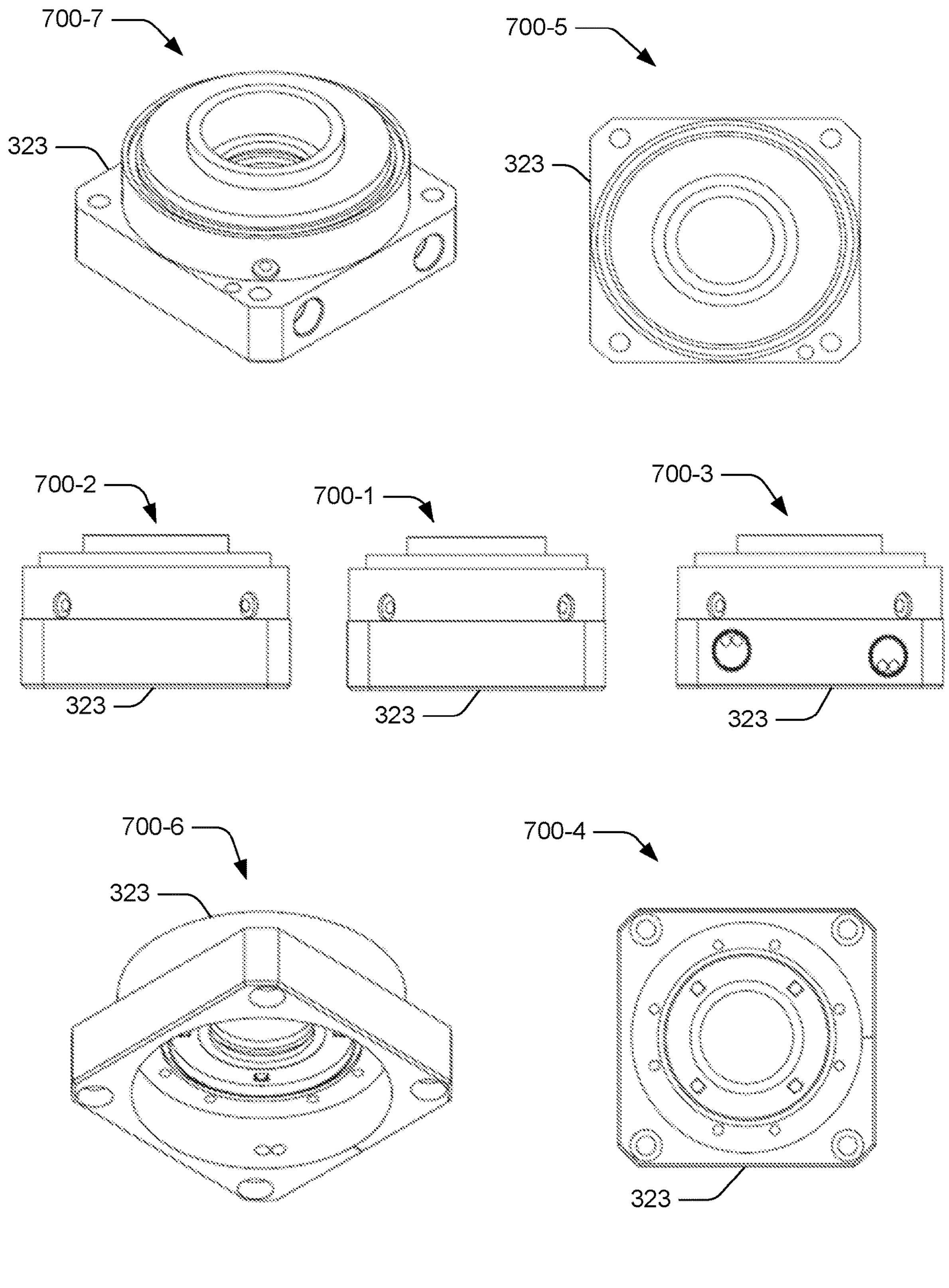
FIG. 7 illustrates various views of a non-limiting example of a distributor block of the rotary actuator.

The cam rotor assembly includes the distributor block 323. FIG. 7 illustrates various views 700 of a non-limiting example of the distributor block 323. In particular, views 700-1, 700-2, 700-3, 700-4, and 700-5 provide a top view, left-side view, right-side view, front view, and back view, respectively. Views 700-6 and 700-7 provide isometric views of the distributor block 323. The distributor block 323 includes a cuboid body with a through hole and a cylinder protruding from one flat surface of the cuboid body. The cylinder protrusion is concentric to the through hole. The distributor block 323 is located with its cylindrical protrusion inside of the largest diameter counterbore in the face of the body 301, with its center axis coincident with the central axis 386 and a counterbore in its cylindrical protrusion fitting tightly around the outside of the needle bearing 322. The cuboid body includes several circular counterbores into the flat surface opposite the protruding cylinder. The distributor block 323 is generally made of metal (e.g., aluminum) and may be plated with a hard and friction-reducing coating (e.g., electroless nickel with Polytetrafluoroethylene).

The flat surface opposite the protruding cylinder also includes four counter-bored through holes that align with four threaded holes in the front face of the body 301. Four screws 332 attach the distributor block 323 to the body 301. In one implementation, the screws 332 are a socket-head cap type.

One of the flat side faces of the cuboid includes two threaded holes (see view 700-3), each including multiple air passage holes in the bottom that extend to the circular inner counterbore. The air passages in the different threaded holes are offset from one another such that they connect to the circular inner counterbore at different locations with respect to the counterbore's center axis. Fluid fittings 325 are threaded into these two threaded holes and enable connection of a pneumatic air or fluid line.

The flat surface of the first counterbore (of the distributor block 323) includes eight tapped holes and a sealing groove. Eight screws 316 are used to attach the distributor cap 312 to the distributor block 323 through their respective screw holes and threaded holes. The screws 316 may be a flathead type with a seal on the underside of the head. The flat surface of the second counterbore includes four holes arrayed evenly spaced about the center axis, with each hole having a counterbored hole perpendicular to its respective axis that extends from the outer surface of the cylindrical protrusion to the hole.

The cam rotor assembly also includes multiple o-rings with round donut-shaped bodies to seal between surfaces. The o-rings are generally made of rubber or similar material and sized or configured to interfere with the multiple surfaces intended to be sealed slightly. For example, the rotary actuator 100 includes two o-rings 313, one o-ring 314, six o-rings 315, three o-rings 318, one o-ring 320, and four o-rings 324. O-ring 20 sits in a circular groove in the face of the cylinder protrusion of the distributor block 323, sealing the counterbored center holes in the body 301. O-ring 318 sits inside the annular groove in the through hole in the distributor block 323 sealing the cylindrical surface of the cam rotor 302. O-rings 324 fit inside the four counterbored holes in the outer cylindrical surface of the distributor block 323, forming a seal with the four air passage holes in the body 301. O-ring 314 is positioned inside the groove near the bottom of the outer counterbore of the distributor block 323 and seals it to the distributor cap 312. Two O-rings 318 sit inside the internal annular grooves of the distributor cap 312 and form a seal between that and the cylindrical outer surface of the cam rotor 302. Two o-rings 313 are located inside two of the outer grooves in the distributor cap 312 and create a seal between it and the distributor block 323.

The rotary actuator 100 includes multiple (e.g., seventeen) metal pins 317 with a cylindrical shape and sized to provide precise positioning between two components that each contain a mating hole. The mating holes have a diameter that is slightly larger or equal to the metal pins 317. For example, the pin 317 sits inside a hole in the face of the distributor block 323 and a corresponding hole in the face of the body 301 for precise locating purposes.

Stacked-Piston Assembly

Figure 9A:
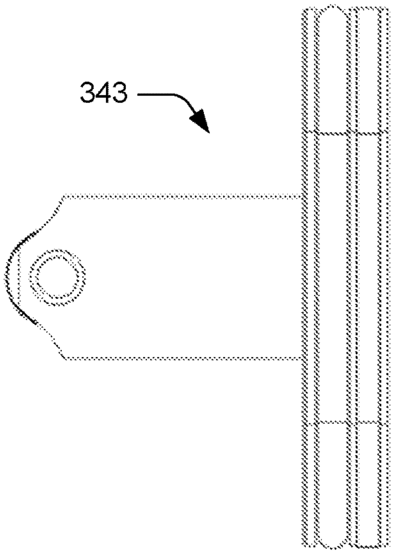
FIGS. 9A and 9B illustrate a side view and an exploded view, respectively, of a non-limiting example of an inner piston assembly of the rotary actuator.
Figure 9B:
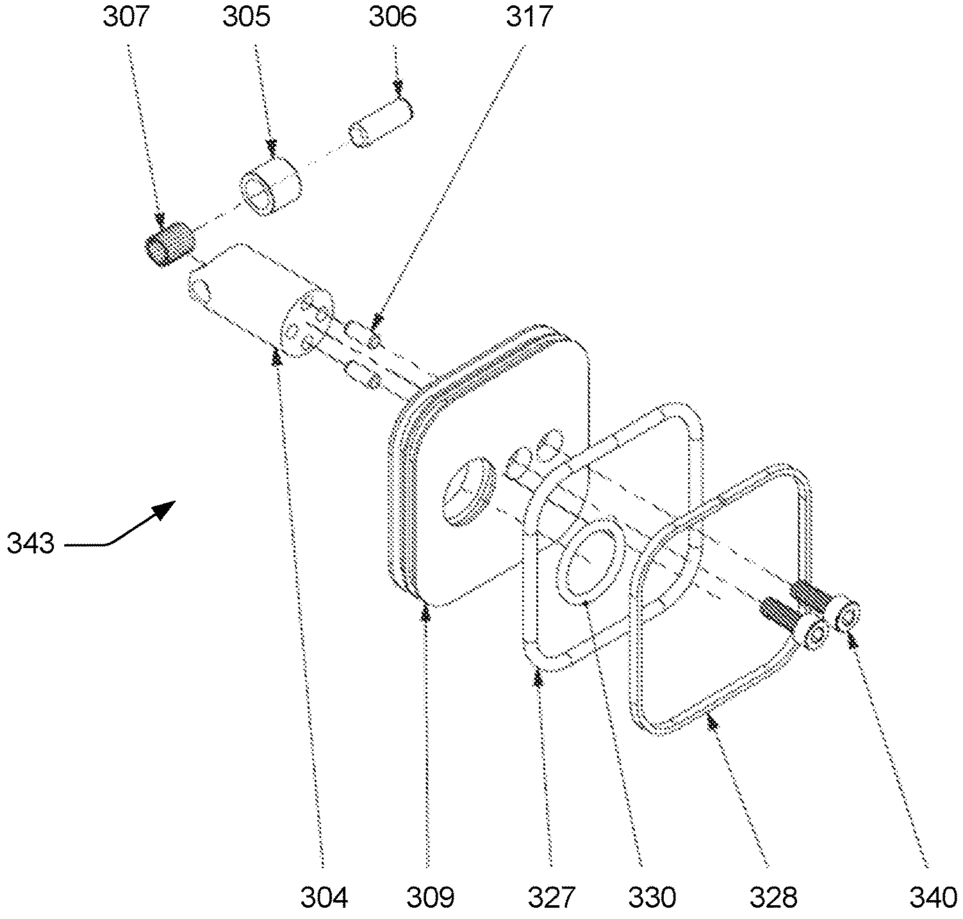

The rotary actuator 100 also includes a stacked-piston assembly on each side of the body 301. Each stacked-piston assembly includes an inner piston assembly 343. FIGS. 9A and 9B illustrate a side view and an exploded view, respectively, of a non-limiting example of the inner piston assembly 343. As illustrated in FIG. 9B, the inner piston assembly 343 includes an inner piston rod 304 that fits inside a respective sleeve bearing 303, piston roller 305, pin 306, and full-complement needle bearing 307. The inner piston rods 304 have a cylindrical body with two tapped holes and two dowel holes in one end, a pocket cutout in the opposite end, and a hole perpendicular to the longitudinal center axis extending through both surfaces bounding the pocket cutout. The piston roller 305 has a cylindrical body with a hole through the center along the longitudinal center axis of the cylinder. The pin 306 is cylindrical and located inside the two holes at the end of the inner piston rod 304 and concentric to the inner bearing surfaces of the full-complement needle bearing 307 to form a rolling element bearing. The inner piston rods 304, piston rollers 305, and pin 306 are generally made of hardened steel or other suitable material. The full-complement needle bearing 307 provides an arrangement of roller pins made from a material such as steel that can form a rolling bearing element in between two concentric cylinders. In particular, the full-complement needle bearing 307 fits concentrically inside the inner diameter of the piston roller 305, and together they sit inside the end of the inner piston rod 304.

The inner piston assembly 343 is positioned with its cylindrical end inside the inner diameter of one of the sleeve bearings 303 that is located closest to the back of the body 301, and its round rolling end is in tangential contact with the first star-shaped cam lobe profile of the cam rotor 302. A second inner piston assembly 343 is located on the opposite side of the body 301 inside the inner diameter of the opposite sleeve bearing 303 that is closest to the back face of the body 301.

The inner piston assembly 343 also includes an inner piston 309, metal pins 317, piston seal 327, piston slider 328, piston rod seal 330, and screws 340. The inner piston 309 has a cuboid body with four rounded edges forming a tangential perimeter along its short edges about which two grooves are located. The inner piston rod 304 is located in the inner piston 309 with its flat end face coincident with the flat end face of the inner piston 309. Parallel to the short edges is an offset from the center hole containing an annular groove concentric to the hole. Parallel to the short edges, the inner piston 309 also includes two screw fixation holes that extend through the body's large face adjacent to two blind dowel holes. The piston seal 327 and piston rod seal 330 have round donut-shaped bodies used for sealing between surfaces and may be made from rubber or similar material. Their sizes are sufficient to interfere slightly with the plurality of surfaces that they are intended to seal. The piston rod seal 330 sits in the inner annular ring of the inner piston 309 to form an inner sealing surface. The piston seal 327 is flexed into a square circle shape to fit a groove of this shape (e.g., in the inner piston 309). The piston slider 328 is a thin, flexible band made from a low-friction material such as Polytetrafluoroethylene with a rectangular cross-section and a length slightly less than the perimeter of the inner piston 309 and outer piston 348. The screws 340 are metal screws that may be a socket head cap type, which fit in the counterbored holes in the face of the inner piston 309 and engage with the threaded holes in the flat face of the inner piston rod 304 to fasten the two together.

Figure 10A:
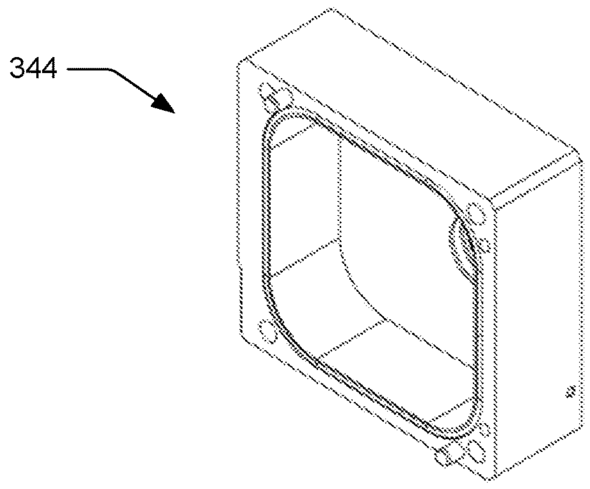
FIGS. 10A and 10B illustrate an isometric view and an exploded view, respectively, of a non-limiting example of an inner chamber housing assembly of the rotary actuator.
Figure 10B:
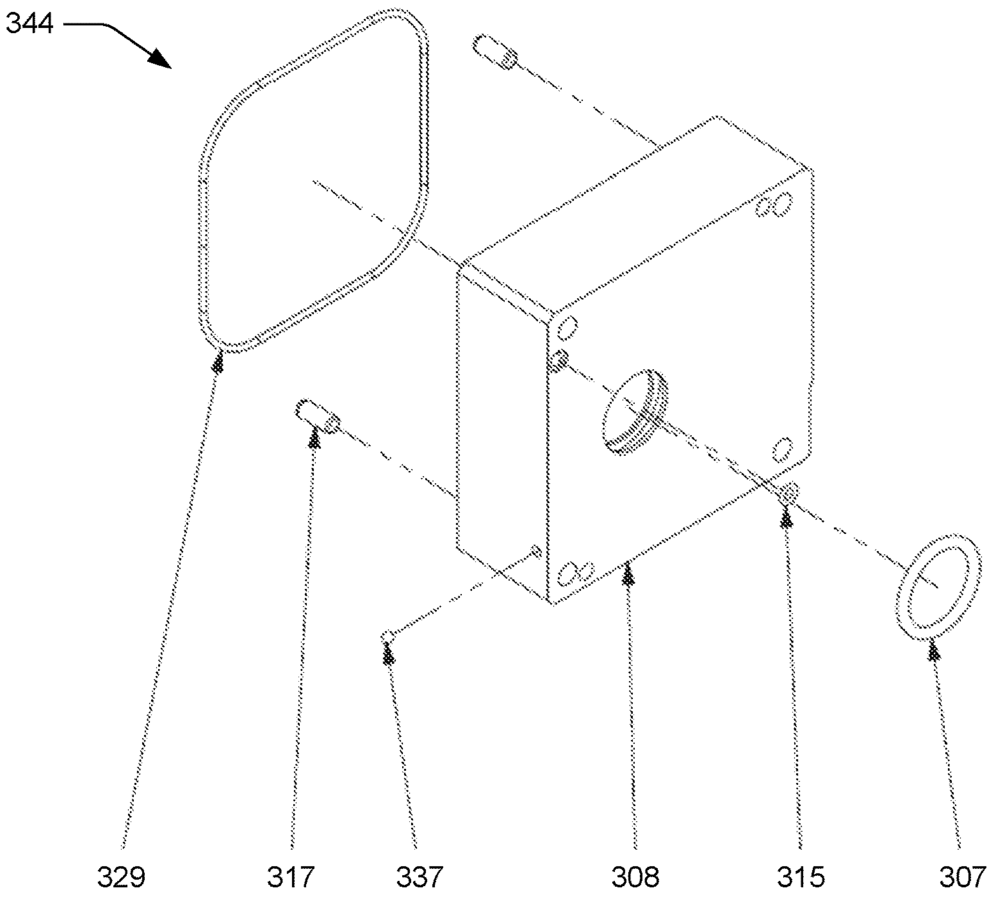

The inner piston assembly 343 fits inside an inner chamber housing assembly 344. FIGS. 10A and 10B illustrate an isometric view and an exploded view, respectively, of a non-limiting example of the inner chamber housing assembly 344. In one implementation, the rotary actuator 100 uses two inner chamber housing assemblies 344 (See FIGS. 3, 10A, and 10B), each of which includes an inner chamber housing 308 with an o-ring seal 329 located in the groove in its flat face containing the rounded square pocket to form a sealing surface. The inner chamber housing assembly 344 also includes metal pins 317, sealing ball 337, o-ring 315, and piston rod seal 330. The inner chamber housing 308 is a cuboid with four screw holes, two dowel holes, and one air passage hole through it parallel to its short edge. The inner chamber housing 308 also includes a rounded square-shaped pocket in one face that is connected to the opposite face with a hole offset from the center. This hole includes an annular groove concentric to the hole. The inner chamber housing 308 is made from aluminum or other suitable material. The o-ring seal 329, o-ring 315, and piston rod seal 330 have round donut-shaped bodies used for sealing between surfaces and may be made from rubber or similar material. Their sizes are sufficient to interfere slightly with the plurality of surfaces that they are intended to seal. O-ring 315 is located in the shallow counterbore in the inner chamber housing 308 in the flat face opposite that which contains the rounded square pocket forming an outer sealing surface. Piston rod seal 330 sits inside the internal annular groove in the largest through hole in the inner chamber housing 308, forming an internal sealing surface. The o-ring seal 329 may be flexed into a square circle shape to fit a groove of this shape. Two pins 317 fit in two holes in the end face of the inner piston rod 304 and the inner piston 309 locating them together precisely. Two pins 317 are also located tightly inside the two dowel holes in the end face of the inner chamber housing 308 that includes the rounded square pocket. The sealing ball 337 is a spherical metal ball, which is press fit inside a side hole of the inner chamber housing 308 to seal the air passage holes in it such that the air passage only has two openings: one into the rounded square pocket and the other into the face of the inner chamber housing 308 that includes the rounded square pocket.

The inner chamber housing assembly 344 is positioned with its rounded square pocket encapsulating the rounded square shape of the inner piston assembly 343 and its flat face containing the rounded square pocket in contact with the end face of the body 301. The dowel pins of the inner chamber housing assembly 344 fit precisely into the dowel holes in the end face of the body 301 to locate it. A second inner chamber housing assembly 344 is positioned on the opposite side of body 301 with its rounded square pocket encapsulating the opposite inner piston assembly 343, and its face containing the rounded square pocket coincides with the other end of body 301.

Figure 11A:
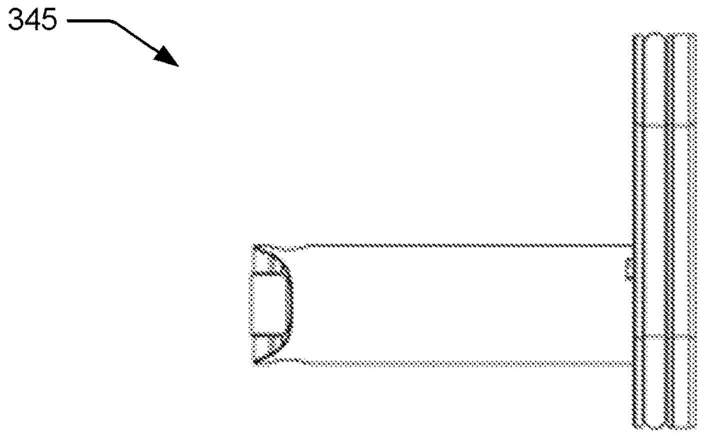
FIGS. 11A and 11B illustrate a side view and an exploded view, respectively, of a non-limiting example of an outer piston assembly of the rotary actuator.
Figure 11B:
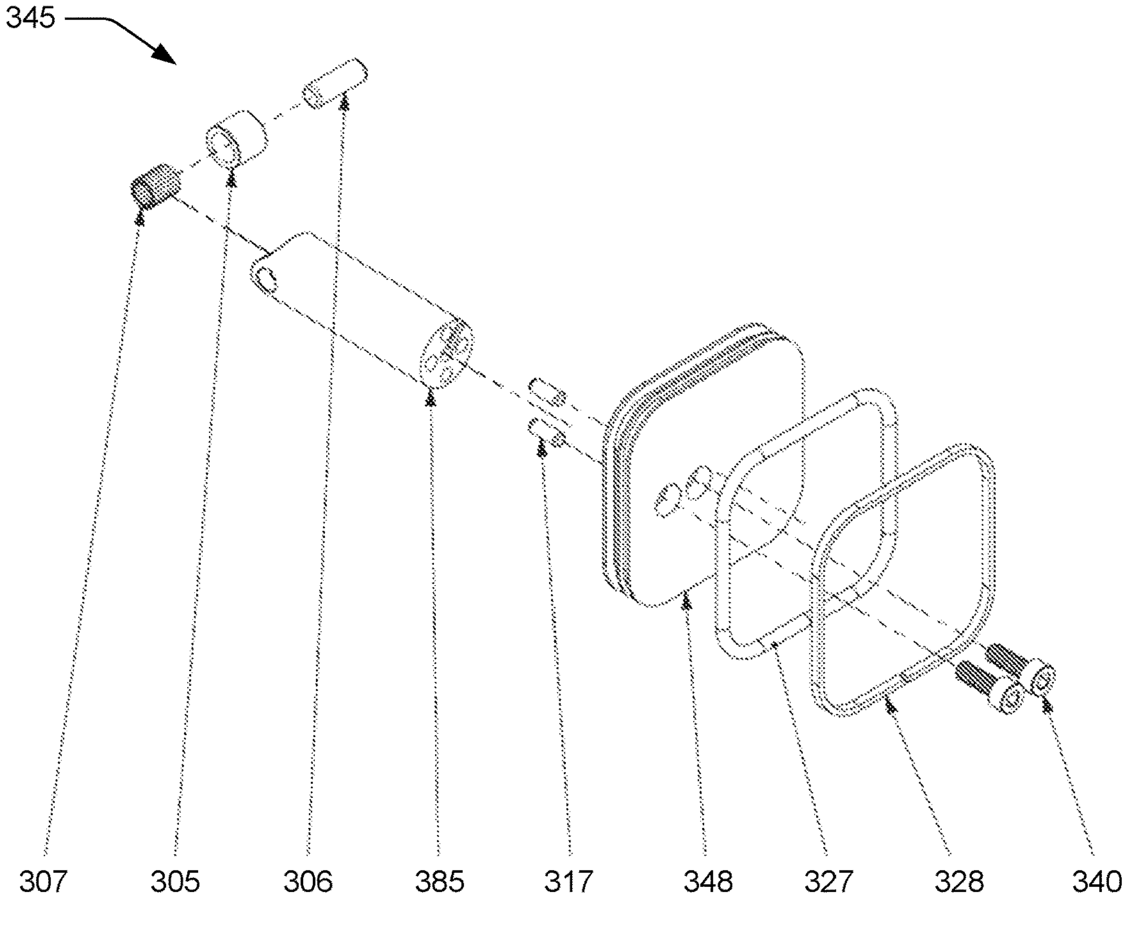

FIGS. 11A and 11B illustrate a side view and an exploded view, respectively, of a non-limiting example of the outer piston assembly 345. In one implementation, the rotary actuator 100 includes two outer piston assemblies 345 (See FIGS. 3, 11A, and 11B), each of which includes an outer piston 348 with a piston seal 327 located around one of its perimeter grooves and a piston slider 328 located around its other perimeter groove. An outer piston rod 385 is located in the outer piston 348 with its flat end face coincident with the flat end face of the outer piston 348. Two pins 317 fit in two holes in the end face of the outer piston rod 385 and outer piston 348, locating them together precisely. Two screws 340 fit in the counterbored holes in the face of the outer piston 348 and engage with the threaded holes in the flat face of the outer piston rod 385 to fasten the two together. A full-complement needle bearing 307 fits concentrically inside the inner diameter of the piston roller 305, and together they sit inside the end of the outer piston rod 385. Pin 306 is located inside the two holes at the end of the outer piston rod 385 and concentric to the inner bearing surfaces of the full-complement needle bearing 307 to form a rolling element bearing.

The outer piston assembly 345 is positioned with its cylindrical end inside the inner diameter of the sleeve bearing 303 located closest to the front of body 301, and its round rolling end is in tangential contact with the second star-shaped cam lobe profile of the cam rotor 302. The cylindrical outer surface of the outer piston assembly 345 forms a sliding seal against the inner diameter of the piston rod seal 330 contained in the inner chamber housing assembly 344 and the inner piston assembly 343. A second outer piston assembly 345 is located on the opposite side of body 301 inside the inner diameter of the opposite sleeve bearing 303 that is closest to the front face of body 301 with the outer cylindrical surface of its outer piston rod 385, forming a sliding seal with the inner sealing surface of the piston rod seal 330 contained in the second inner piston assembly 343 and the second inner chamber housing assembly 344. The second outer piston assembly 345 is located with its round rolling end in tangential contact with the second star-shaped cam lobe profile of the cam rotor 302.

Figure 17:
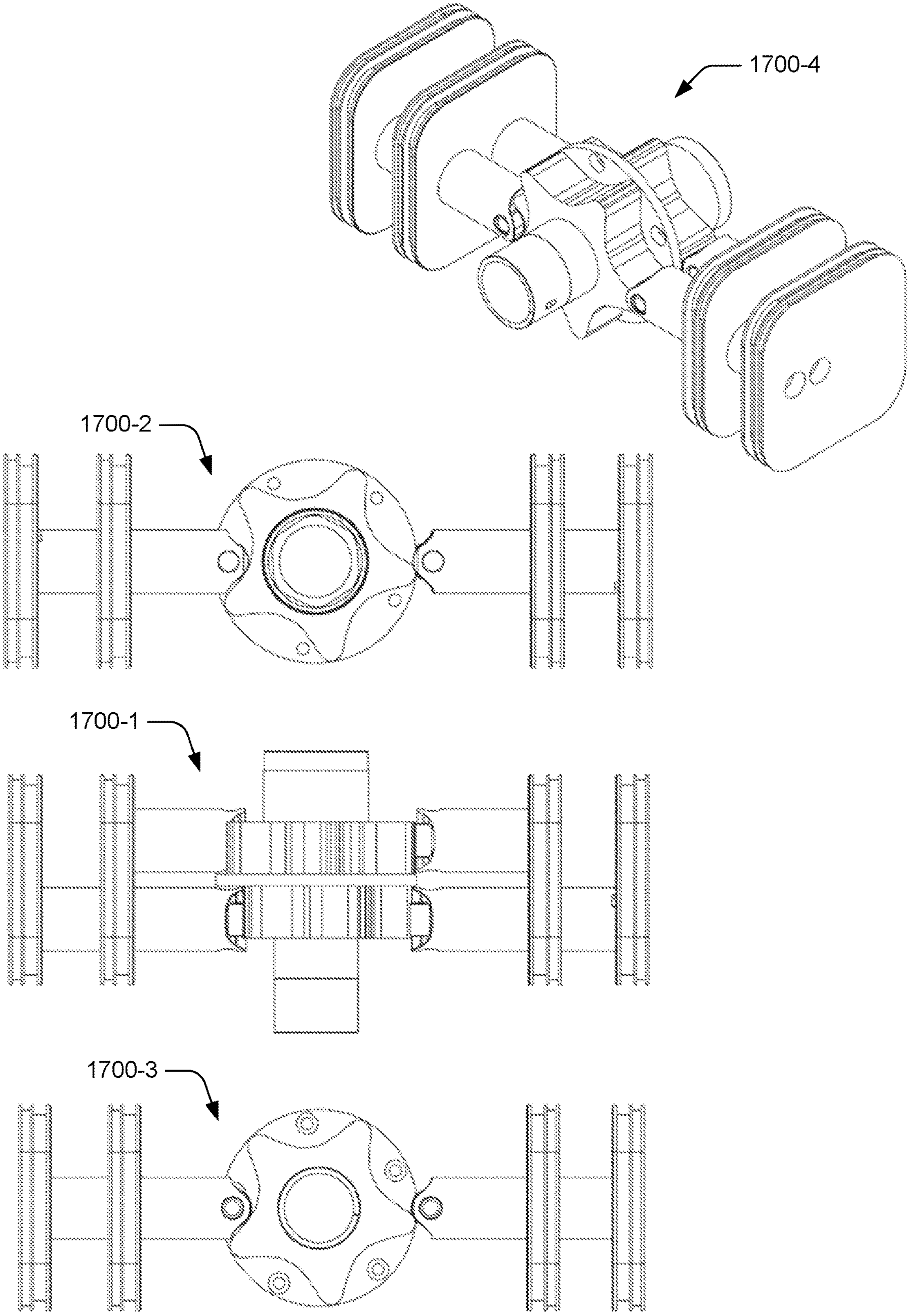
FIG. 17 illustrates various views of a non-limiting example of an arrangement and layout of the pistons, rods, and cam rotor of the rotary actuator.

The arrangement and layout of the pistons, rods, and cam rotor 302 with other parts hidden is illustrated in views 1700-1, 1700-2, 1700-3, and 1700-4 of FIG. 17. Views 1700-1, 1700-2, and 1700-3 provide a top view, back view, and front view, respectively, of the pistons, rods, and cam rotor 302. An isometric view is provided in view 1700-4. This combination of pistons and rods provide a compact stacked design pushing on a cam rotor mechanism to create a mechanical advantage that generates sufficient clamping force from normally-available (e.g., "shop") air pressure. In the illustrated embodiment of the rotary actuator 100, four pistons act on a central cam rotor, but the piston rods are offset from the center, and the outer piston rods pass through a sealed hole in the inner pistons, allowing for a very compact design that would otherwise be much longer or wider to create a similar amount of torque within a given device size.

Figure 12A:
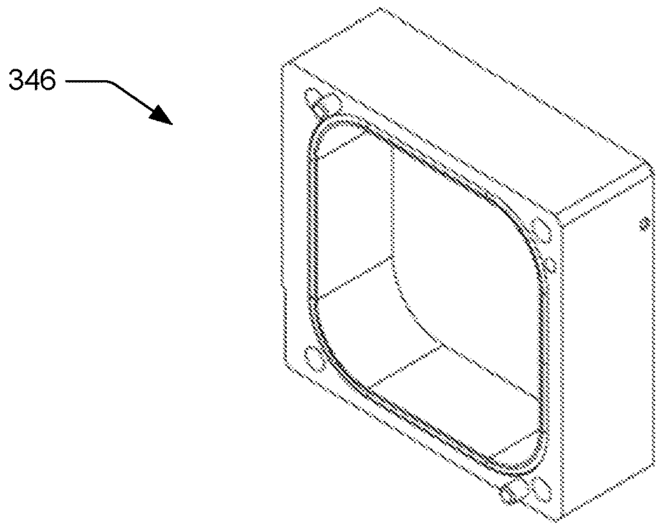
FIGS. 12A and 12B illustrate an isometric view and an exploded view, respectively, of a non-limiting example of an outer chamber housing assembly of the rotary actuator.
Figure 12B:
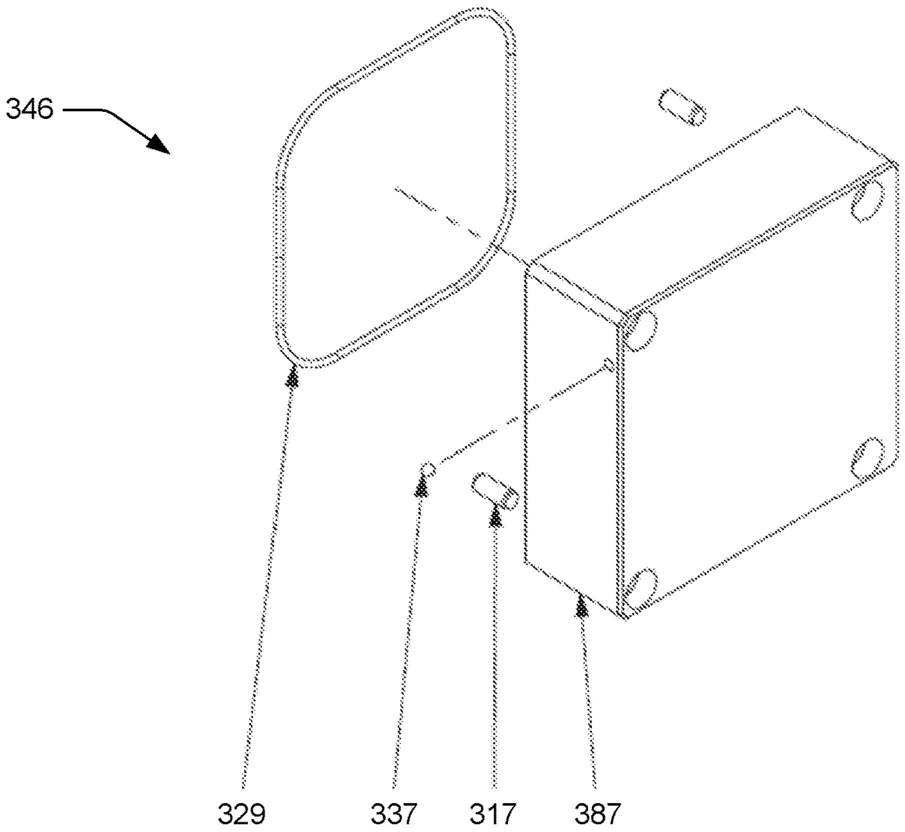

FIGS. 12A and 12B illustrate an isometric view and an exploded view, respectively, of a non-limiting example of the outer chamber housing assembly 346. In one implementation, the rotary actuator 100 includes two outer chamber housing assemblies 346 (See FIGS. 3, 12A, and 12B), each of which includes an outer chamber housing 387 with an o-ring seal 329 located in the groove in its flat face containing the rounded square pocket to form a sealing surface. Two pins 317 are located tightly inside the two dowel holes in the end face of the outer chamber housing 387, including the rounded square pocket. Sealing ball 337 is press fit inside a side hole of the outer chamber housing 387 to seal the air passage holes in it such that the air passage only has two openings: one into the rounded square pocket and the other into the face of the outer chamber housing 387 that includes the rounded square pocket.

The outer chamber housing assembly 346 is positioned with its rounded square pocket encapsulating the rounded square shape of the first outer piston assembly 345 and its flat face containing the rounded square pocket in contact with the end face of the first inner chamber housing assembly 344. The dowel pins of the outer chamber housing assembly 346 fit precisely into the dowel holes in the inner chamber housing assembly 344. A second outer chamber housing assembly 346 is positioned on the opposite side of body 301 with its rounded square pocket encapsulating the opposite outer piston assembly 345 and its face containing the rounded square pocket is coincident with the end of the second inner chamber housing assembly 344.

Figure 14A:
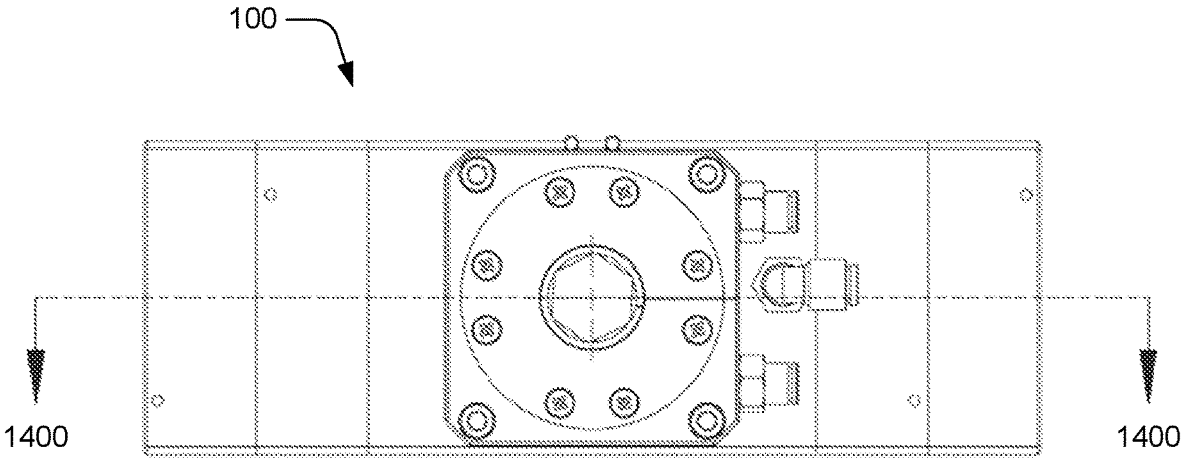
FIGS. 14A and 14B illustrate various views of non-limiting examples of the rotary actuator with a stacked piston design.
Figure 14B:
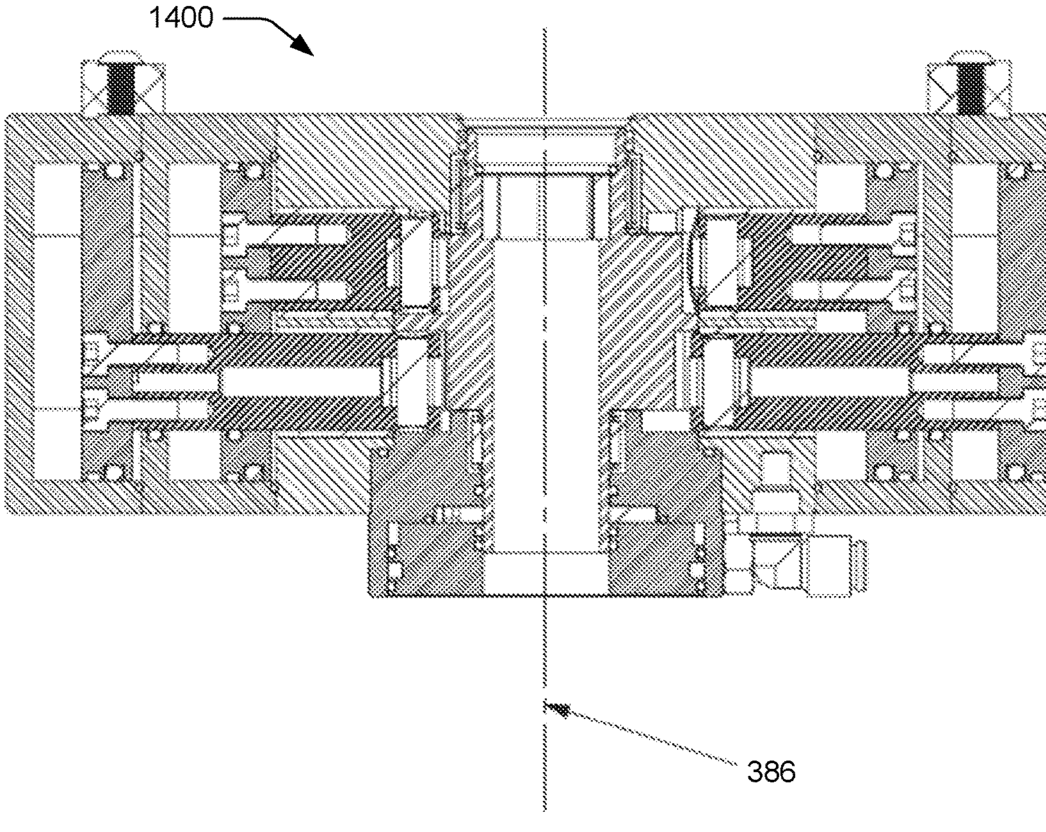

FIG. 14A provides a top view of the rotary actuator 100 with a cross-section view 1400 illustrated in FIG. 14B. FIG. 14B illustrates the cross-section view 1400 of the stacked piston design in the rotary actuator 100.

Four screws 331, which may be a socket head cap type screw, are located through the holes in the first outer chamber housing assembly 346 and inner chamber housing assembly 344 and threaded into the threaded holes in the end face of body 301 to fix the first outer chamber housing assembly 346 and inner chamber housing assembly 344 to body 301. Four screws 331 are located through the holes in the second outer chamber housing assembly 346 and second inner chamber housing assembly 344 and threaded into the threaded holes in the end face of body 301 to fix the second outer chamber housing assembly 346 and second inner chamber housing assembly 344 to body 301.

Rotary Actuator in Use

Piston Movement and Torque Generated on the Cam Rotor

Figure 13A:
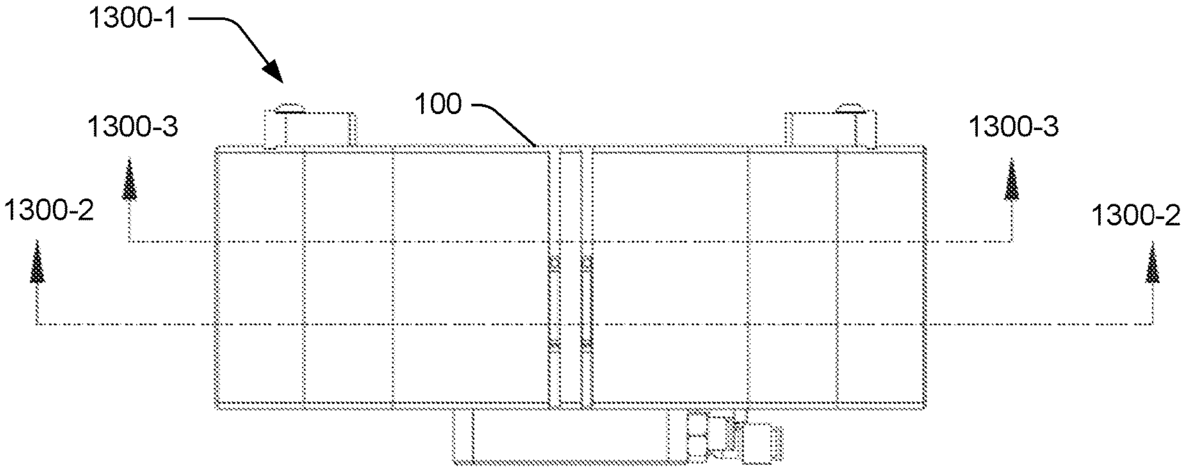
FIGS. 13A through 13I illustrate various views of non-limiting examples of the rotary actuator as piston movement is created to generate torque on the cam rotor.
Figure 13B:
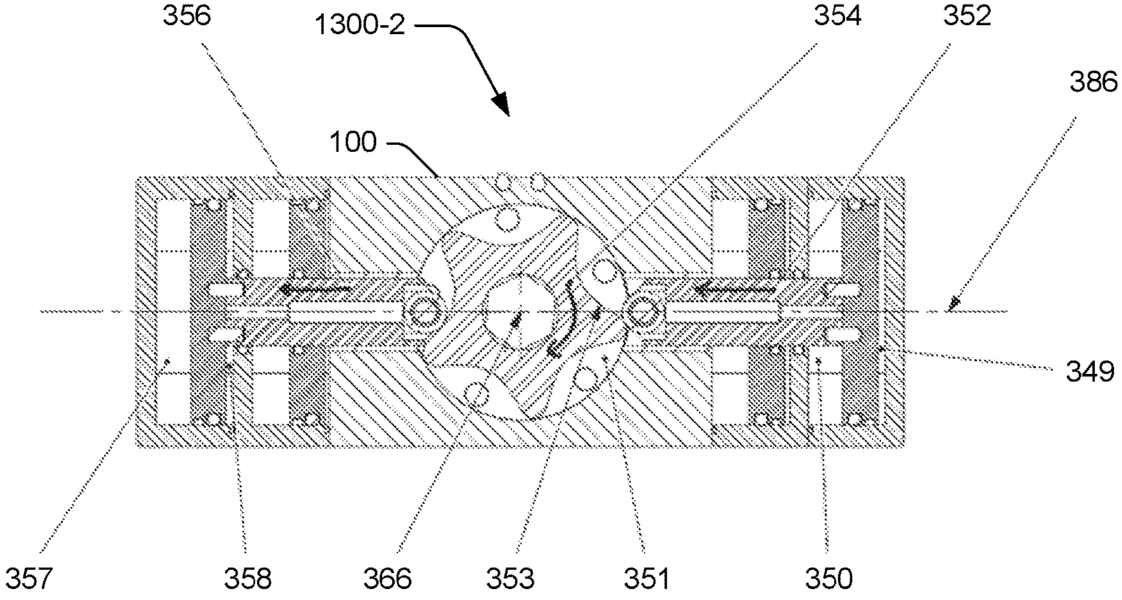
Figure 13C:
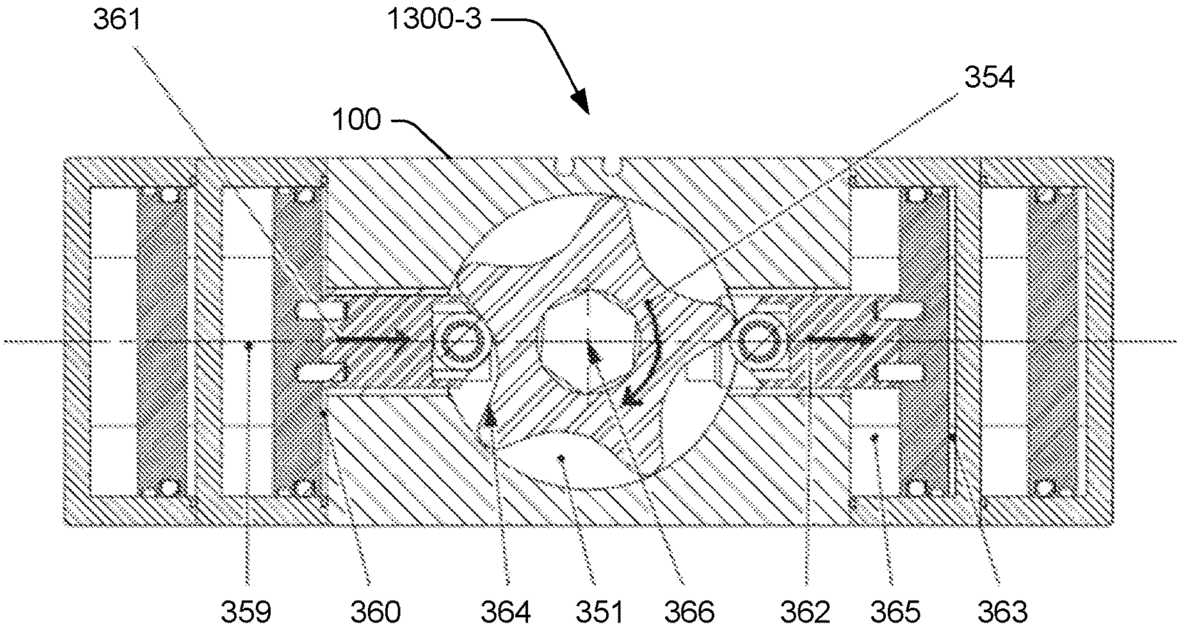

FIG. 13A provides a top view 1300-1 of the rotary actuator 100 with cross-section views 1300-2 and 1300-3, illustrated in FIGS. 13B and 13C, respectively. FIGS. 13B and 13C illustrate cross-sections of the rotary actuator 100 as a first piston movement is created to generate torque on the cam rotor 302.

FIG. 13B illustrates cross-section view 1300-2 of the outer piston assemblies. Consider an example when a fluid pressure (e.g., 100 psi) is applied to a first outer pressure chamber 349 formed between the sealed sliding surfaces of the first outer piston assembly 345 and the first outer chamber housing assembly 346. The first outer piston assembly 345 moves in an inward direction 352 due to lower pressure in the first outer vented chamber 350 because it is vented through an air passage in the outer piston rod 385 to the central vented chamber 351. The central vented chamber 351 is vented (e.g. to atmospheric pressure) through its connection to fluid fitting 339.

This movement of the first outer piston assembly 345 occurs with a significant amount of force (e.g., about 594 pounds), which may be calculated by multiplying the square inches of sealed surface area of the face of outer piston 348 by the pressure differential between the first outer pressure chamber 349 and the first outer vented chamber 350. The force of this movement (e.g., in the inward direction 352) causes the piston roller 305 of outer piston assembly 345 to contact the second star-shaped cam lobe profile 353 of cam rotor 302, which causes the cam rotor 302 to rotate in a clockwise direction 354 because the contact of the rolling element with the cam profile creates a force directionally perpendicular to the tangent line of the contact point. Because the cam rotor 302 is otherwise fixed within the bearings in body 301, the rotational force is applied to the cam rotor 302 for rotational positions where the line created perpendicular to the tangent line of the contact point does not coincide with the central axis 386. This document calls this interaction from the linear piston movement to the rotation of the cam rotor "Linear to Rotational Movement Conversion."

If the second outer pressure chamber 357 and the second outer vented chamber 358 are connected to a lower pressure (e.g., atmospheric pressure), the second outer piston assembly 345 is (relatively) free to move. The rotation of the second star-shaped cam lobe profile 353 advances the piston roller 305 of the second outer piston assembly 345 pushing it in an outward direction 356 by the reverse of this interaction.

FIG. 13C illustrates cross-section view 1300-3 of the inner piston assemblies. In particular, cross-section view 1300-3 illustrates the inner piston assemblies 343 as they contact the first star-shaped cam lobe profile of the cam rotor 302. As the outer piston assemblies move (as described in relation to FIG. 13B), a pressure (e.g., 100 psi) is also applied to the second inner pressure chamber 359, and the second inner vented chamber 360 is vented (e.g., to atmospheric pressure). This pressure differential creates another linear force, causing the sealed second inner piston assembly 343 to move away from the pressure differential in an inward direction 361. The second inner piston assembly 343 contacts the first star-shaped cam lobe profile 364 and causes the cam rotor 302 to rotate in a clockwise direction 354 with significant torque through "Linear to Rotational Movement Conversion." This applied torque increases the torque on the cam rotor 302, summing it with the torque created by the first outer piston assembly (as described in relation to FIG. 13B) into a significant torque (e.g., approximately 50 ft-lbs.) generated at the center of the cam rotor 302. Meanwhile, if the first inner pressure chamber 363 and first inner vented chamber 365 are vented via air passages and have approximately equal pressure, the unpressurized first inner piston assembly 343 is (relatively) free to move. The opposite of the "Linear to Rotational Movement Conversion" will occur, causing this first inner piston assembly 343 to move in an outward direction 362.

Figure 13D:
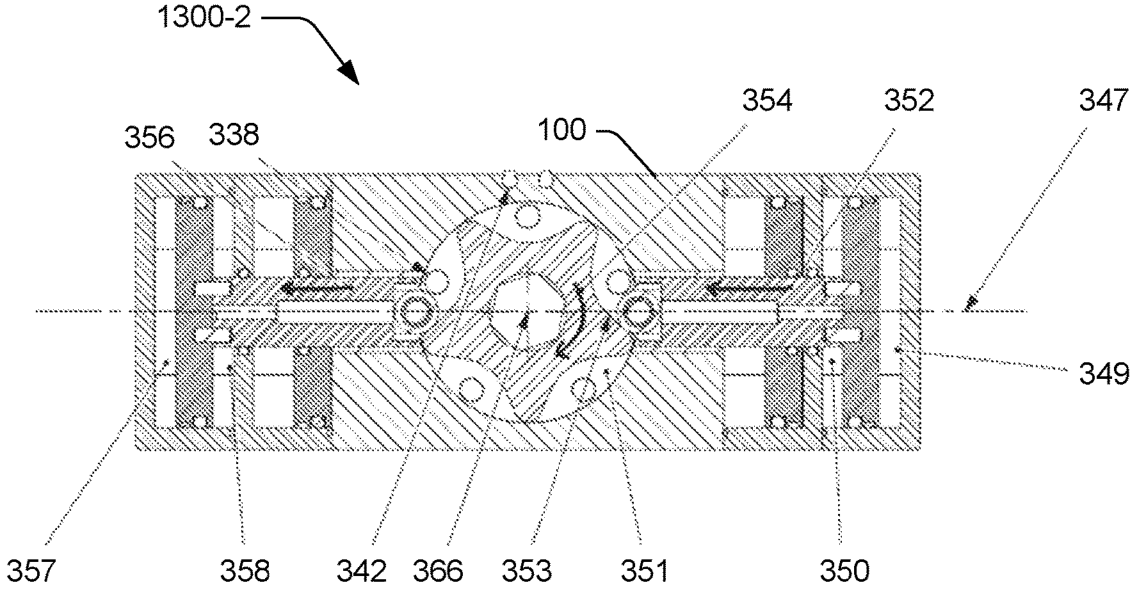
Figure 13E:
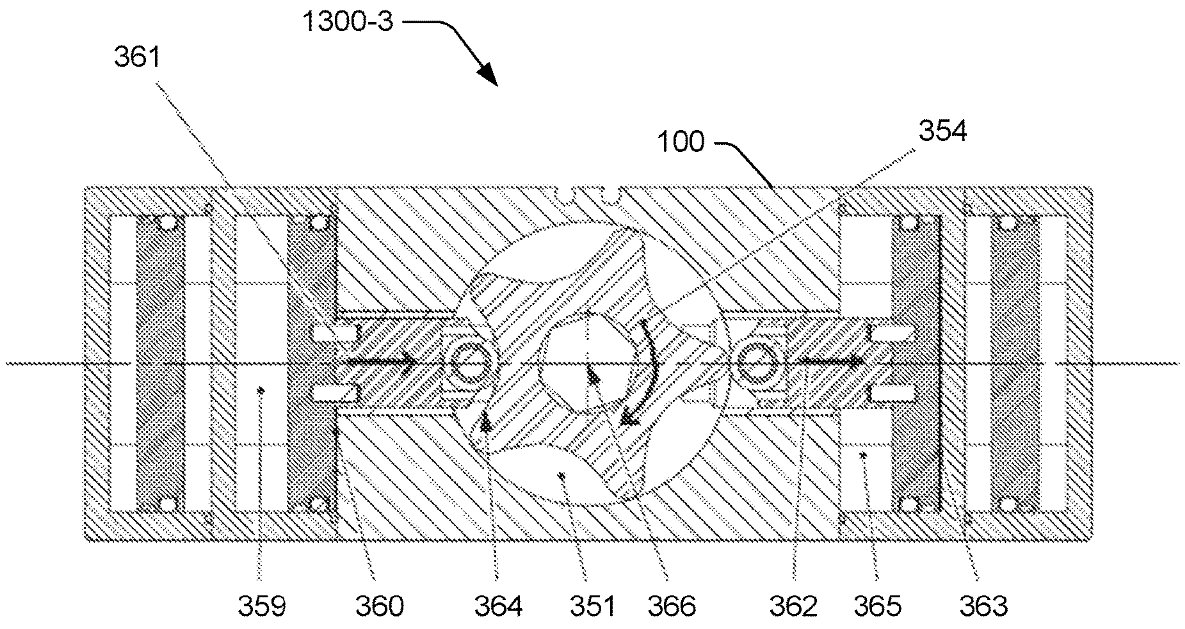

FIGS. 13D and 13E illustrate cross-section views 1300-2 and 1300-3, respectively, of the rotary actuator 100 as the first piston movement continues. As illustrated in FIG. 13E, the pressurized second inner piston assembly 343 continues applying force and moving in an inward direction 361 until the "Linear to Rotational Movement Conversion" interaction ceases due to the line created perpendicular to the tangent line of the contact point approximately intersecting with the cam rotor center axis 366. The torque created by the inner piston assembly 343 on the cam rotor 302 slowly diminishes as it approaches this point of zero torque. However, as the torque created by the second inner piston assembly 343 diminishes, the first outer piston assembly 345 increases the torque applied to the cam rotor 302 as it continues to move in the inward direction 352 (as illustrated in FIG. 13D). In particular, the piston roller 305 of the first outer piston assembly 345 moves toward a position on the second star-shaped cam lobe profile 353 that generates an increasing amount of torque through the "Linear to Rotational Movement Conversion." The advantageous contact angle and distance from the cam rotor center axis 366 at this position cause this increasing torque. The two forces sum to a single or total torque (e.g., approximately 50 ft-lbs.) generated at the cam rotor 302.

If the pressure applied to the second inner pressure chamber 359 is relieved (e.g., vented to atmospheric pressure), the second inner piston assembly 343 no longer applies significant force in the inward direction 361 (as illustrated in FIG. 13E). However, the first outer piston assembly 345 now generates near its maximum torque on the cam rotor 302, which causes it to continue to rotate in a clockwise direction 354 towards a position illustrated in FIGS. 13F and 13G, and this torque starts to diminish.

Figure 13F:
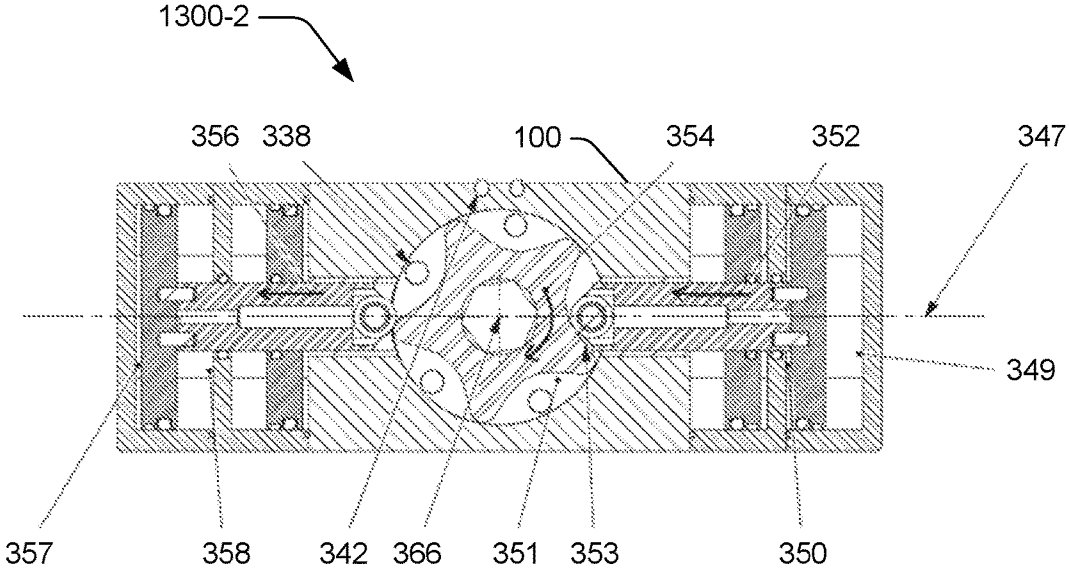
Figure 13G:
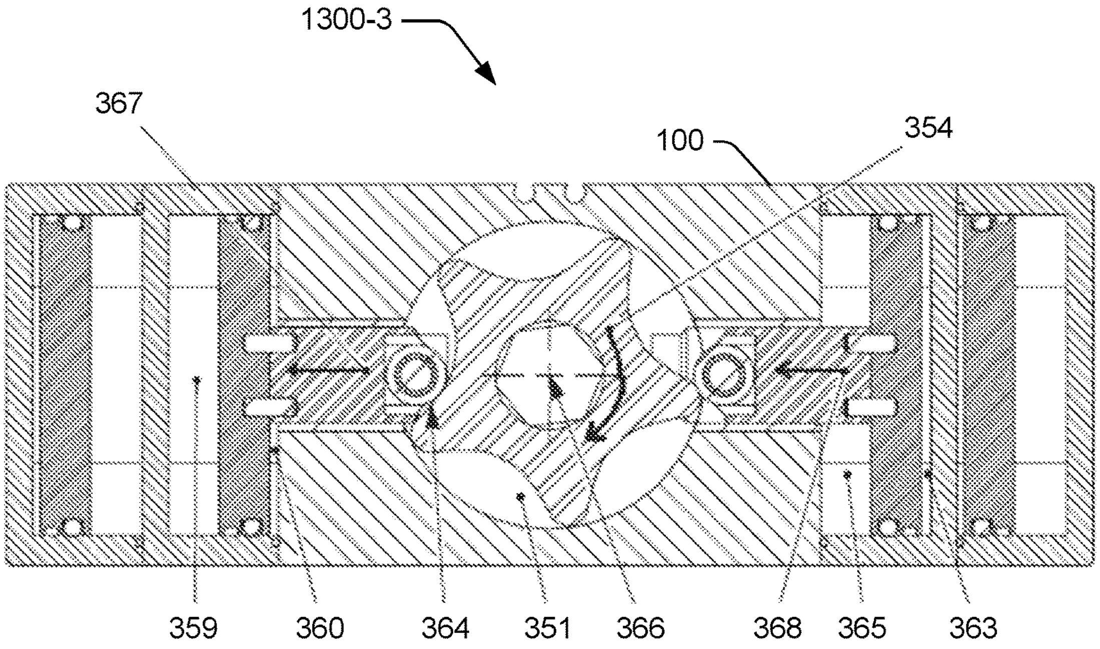
Figure 13H:
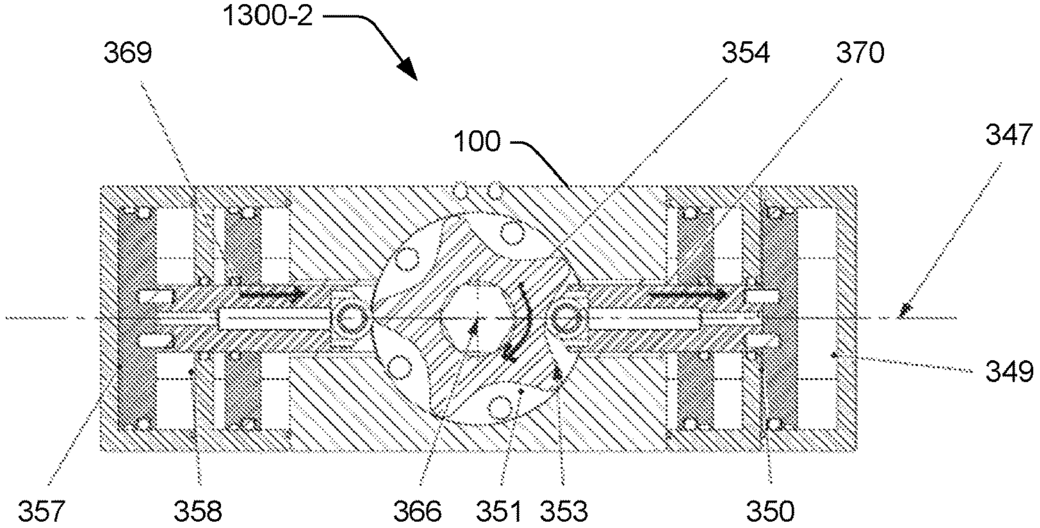
Figure 13I:
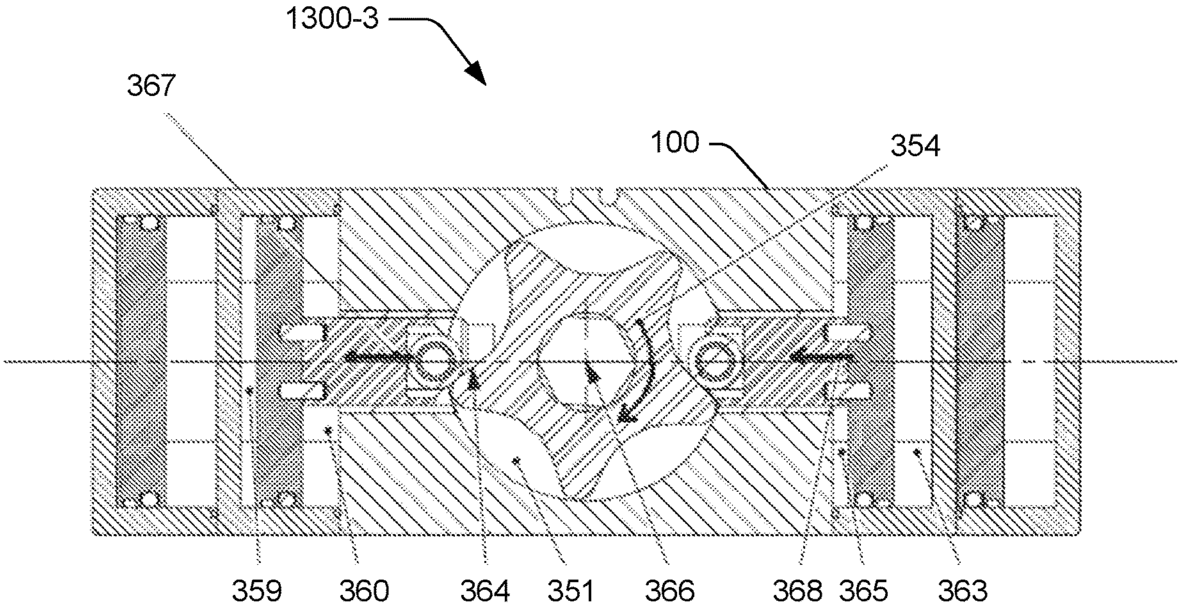

FIGS. 13F and 13G illustrate cross-section views 1300-2 and 1300-3, respectively, of the rotary actuator 100 as the first piston movement continues. Similarly, FIGS. 13H and 13I illustrate cross-section views 1300-2 and 1300-3, respectively, of the rotary actuator 100 as the first piston movement continues.

If a pressure (e.g., between 15 and 200 psi) is applied to the first inner pressure chamber 363 as shown in FIG. 13G, the first inner piston assembly 343 is forced in an inward direction 368 because the first inner vented chamber 365 has a lower pressure (e.g., it is vented to atmospheric pressure). The piston roller 305 of the first inner piston assembly 343 contacts the first star-shaped cam lobe profile 364 of the cam rotor 302 and applies torque in the clockwise direction 354 through the "Linear to Rotational Movement Conversion." The generated torque sums with the now diminishing torque created by the first outer piston assembly 345 (as illustrated in FIG. 13F) to create torque (e.g., approximately 50 ft-lbs.) at the cam rotor 302. If the second inner pressure chamber 359 is now vented (e.g., to atmospheric pressure), the second inner piston assembly 343 is relatively free to move in an outward direction 367 and is forced to do so by the opposite of "Linear to Rotational Movement Conversion."

The first inner piston assembly 343 continues exerting force and increasing torque on the cam rotor 302 as its piston roller 305 moves into its most mechanically advantageous position in relation to the first star-shaped cam lobe profile 364. As the first inner piston assembly 343 starts to pass this most advantageous point, the first outer piston assembly 345 reaches a point where it is no longer exerting torque. However, if the first outer pressure chamber 349 is then vented to atmospheric pressure at the same time as the second outer pressure chamber 357 has a pressure applied to it (e.g., 100 psi), the second outer piston assembly begins to move in an inward direction 369 as illustrated in FIG. 13H. The "Linear to Rotational Movement Conversion" applies an increasing torque to the cam rotor 302 in a clockwise direction 354, which sums with the now decreasing torque created by the first inner piston assembly 343 and maintaining a total torque (e.g., 50 ft-lbs). At approximately this point, the pressure in the first outer pressure chamber 349 may be vented to atmospheric pressure, allowing the first outer piston assembly 345 to move in an outward direction 370 through the opposite of the "Linear to Rotational Movement Conversion."

The preceding description in relation to FIGS. 13A through 13I describe an example sequence in which the four different piston assemblies operate on the first and second star-shaped cam lobe profiles 353, 364 by alternating a high pressure and then a lower pressure (e.g., vented to atmospheric pressure) in their respective pressure chambers to drive the cam rotor 302 through approximately 36 degrees of rotation (e.g., 180 degrees divided by five cam lobes). The first and second star-shaped cam lobe profiles 353, 364 each have five equivalent lobes, equally spaced about the cam rotor center axis 366 (albeit with an 18-degree rotational phase offset between the two). As a result, each full lobe comprises a 72-degree segment of the cam rotor 302, and the first half of each of these segments (or 36 degrees) is utilized during the compression stroke of each piston assembly to exert torque in a clockwise direction 354. At the same time, the second half of the segment (or 36 degrees) is used to drive the piston back outwards while its pressure chamber is vented to atmospheric pressure (also referred to as an "Exhaust Stroke"). The rotary actuator 100 rotates the cam rotor 302 (and thus the vise 102) by continuing this process of pressuring and then venting each pressure chamber at the appropriate time (or rotational position) to effect a significant, and approximately constant torque output at the cam rotor 302 (e.g., 50 ft-lbs.). If timed pressure and venting are continually applied to the pressure chambers in this way, continuous rotation of the cam rotor 302 is created with significant torque available.

Now consider a situation in which the two pressures in the pressure chambers described above are inverted (e.g., replacing a high pressure for a lower pressure). The effect is to reverse the direction of movement and force of the piston assemblies at the various phases described. The reversal of the applied force, in turn, reverses the direction of the forced rotation of the cam rotor 302, such that it rotates and exerts torque opposite the clockwise direction 354 shown in FIG. 13. The opposite rotation causes a continuous rotation of the cam rotor 302, with approximately constant torque in a counter-clockwise direction.

In this way, the described rotary actuator 100 provides improved systems and techniques for clamping and unclamping vise fixtures by using four single-acting pneumatic (fluid) driven pistons to create a higher torque output per pressure unit input while also minimizing the required length, width, and depth of the system due to its power-dense design. This high-torque output per pressure unit input allows the rotary actuator 100 to be used in heavy manufacturing operations where vise fixtures require high-holding torque without needing to employ auxiliary pressure-increasing systems (e.g., air pressure intensifiers). For example, in one size implementation of the rotary actuator 100 readily available "shop-air" pressure of around 100 psi is used to output torque values of around 50 foot-pounds. The stacked piston design also simplifies manufacturing by using fairly simple parts and minimizes the footprint of the rotary actuator 100 to fit in the typically tight-dimensioned environment of CNC machines.

High- and Low-Pressure Distribution and Timing

In the previous section, this document explained the effect that timed periods of high and low pressure applied to the four pressure chambers and piston assemblies of the rotary actuator 100 have on torque and the rotation direction of the cam rotor 302. In the following paragraphs, this document describes techniques for accomplishing these timed periods of high and low pressure, with references to FIGS. 15A through 16D.

Figure 15A:
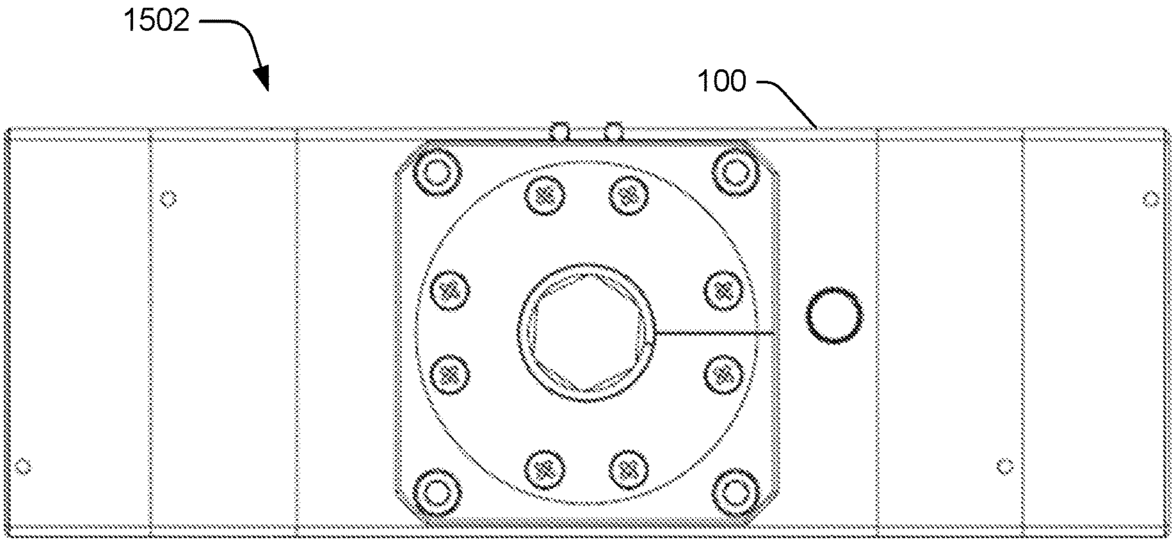
FIGS. 15A through 15D illustrate various views of a non-limiting example of the distributor cap, internal holes, and annular grooves of the rotary actuator.
Figure 15B:
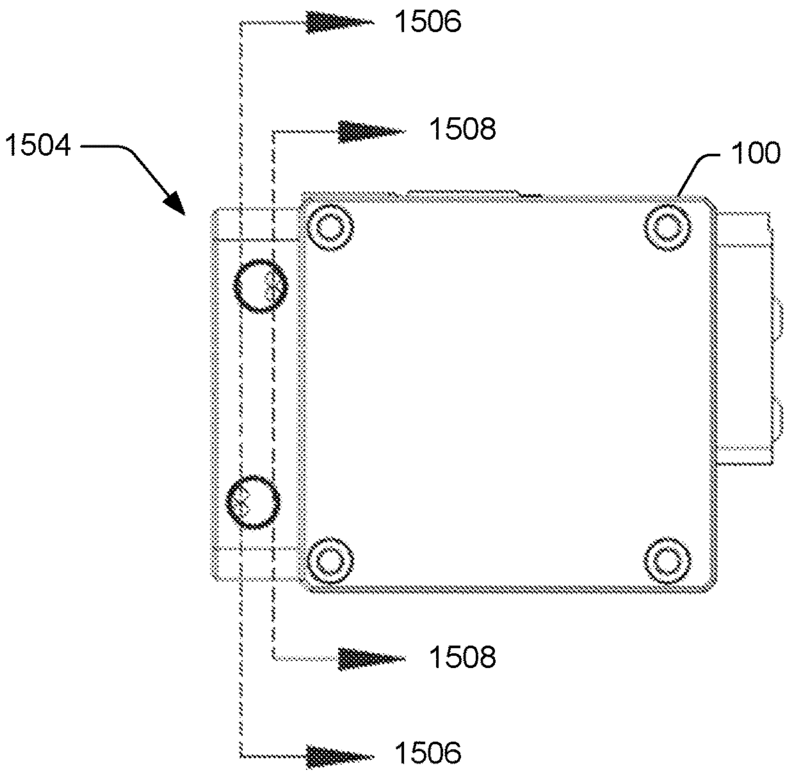
Figure 15C:
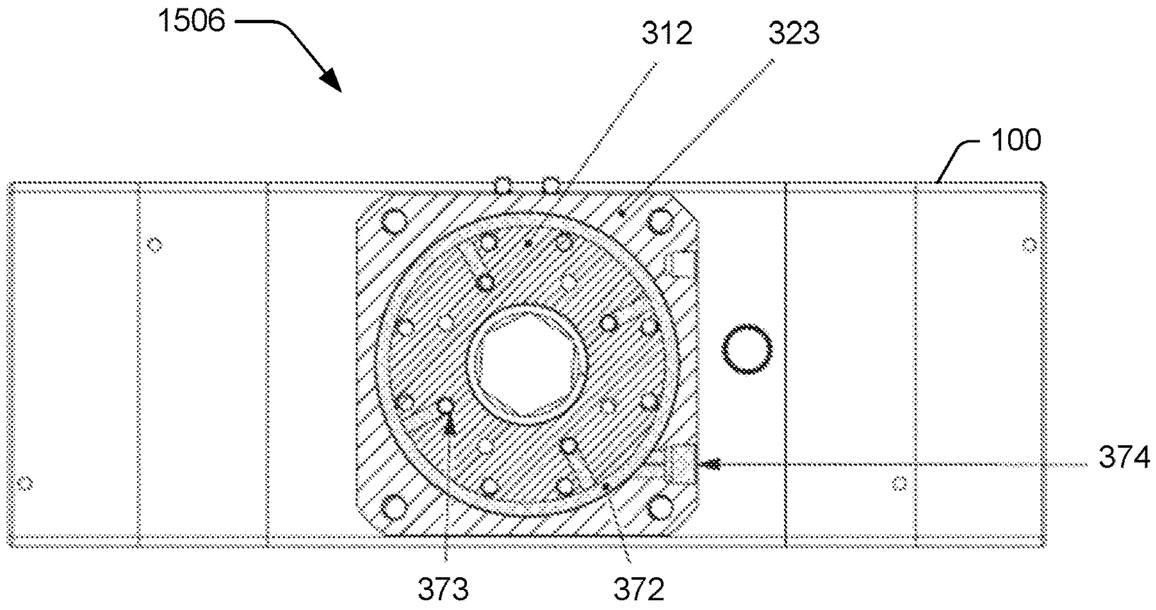
Figure 15D:
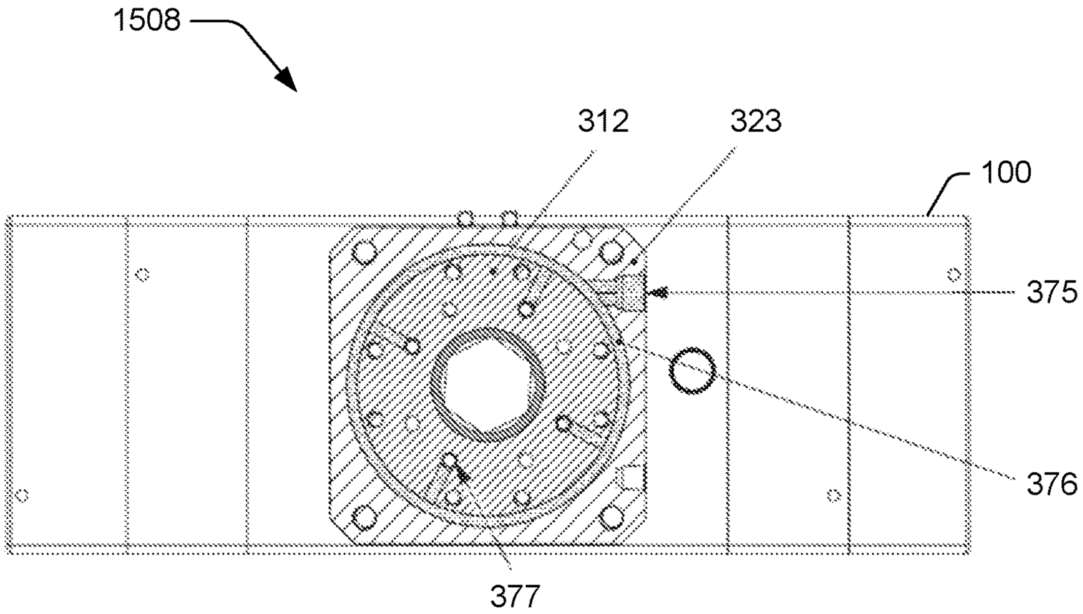
Figure 16A:
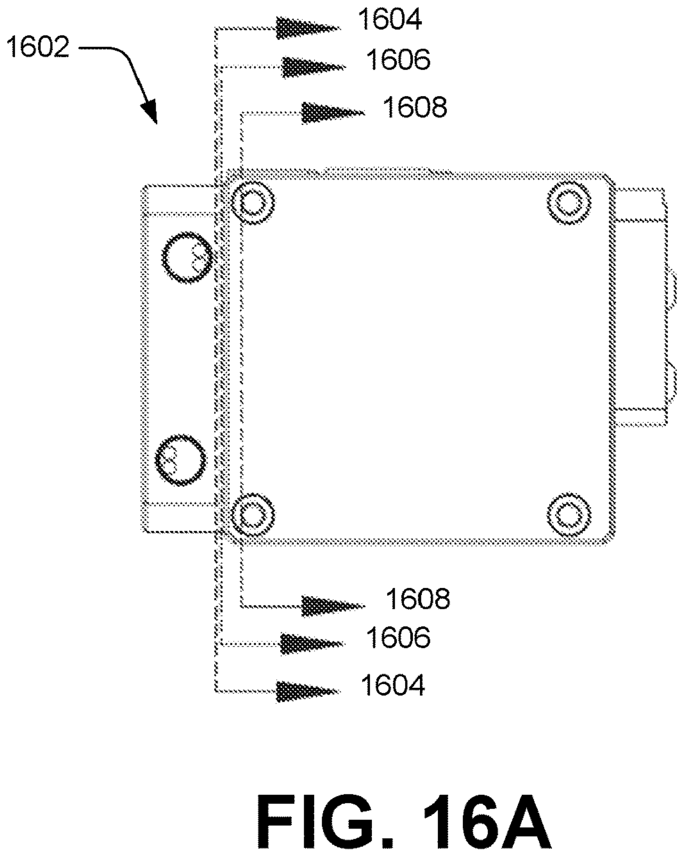
FIGS. 16A through 16D illustrate various views of a non-limiting example of the distributor wheel, internal holes, internal slots, and annular grooves of the rotary actuator.

FIG. 15A illustrates a front view 1502 of an example implementation of the rotary actuator 100 with the two fluid fittings 325 and fluid fitting 339 removed for clarity. FIG. 15B provides a right-side view 1504 of the rotary actuator 100 with cross-section views 1506 and 1508, illustrated in FIGS. 15C and 15D, respectively. FIG. 16A provides a right-side view 1602 of the rotary actuator 100 with cross-section views 1604, 1606, and 1608, illustrated in FIGS. 16B through 16D, respectively.

If a fluid fitting 325 is installed in the port 374 hole (see FIG. 15C) and high pressure (e.g., 100 psi) is applied to the fluid fitting 325 (e.g., via tubing and a fluid valve), the (high) pressure transfers through the two small holes in the bottom of port 374 and into the annular groove 372 of the distributor cap 312. The pressure then transfers from there through the four radial holes connecting the annular groove 372 to the four transfer holes 373. The transfer holes 373 extend axially inward in a direction parallel to the central axis 386 until intersecting with the inner end face of the distributor cap 312. As a result, the four transfer holes 373 are at high pressure. In FIG. 15C, the area(s) of high pressure is indicated by dotted cross-hatching.

If a fluid fitting 325 is installed in the port 375 hole (see FIG. 15D) and low pressure (e.g., atmospheric pressure) is applied to the fluid fitting 325 (e.g., via tubing and a fluid valve), the (low) pressure transfers through the two small holes in the bottom of port 375 and into the annular groove 376 of the distributor cap 312. The pressure transfers through the four radial holes connecting the annular groove 376 to the four transfer holes 377. The transfer holes 377 extend axially inward in a direction parallel to the central axis 347 until intersecting with the inner end face of the distributor cap 312. As a result, the four transfer holes 377 are at low pressure. In FIG. 15D, the area(s) of low pressure is indicated by horizontal dashed hatching.

Figure 16B:
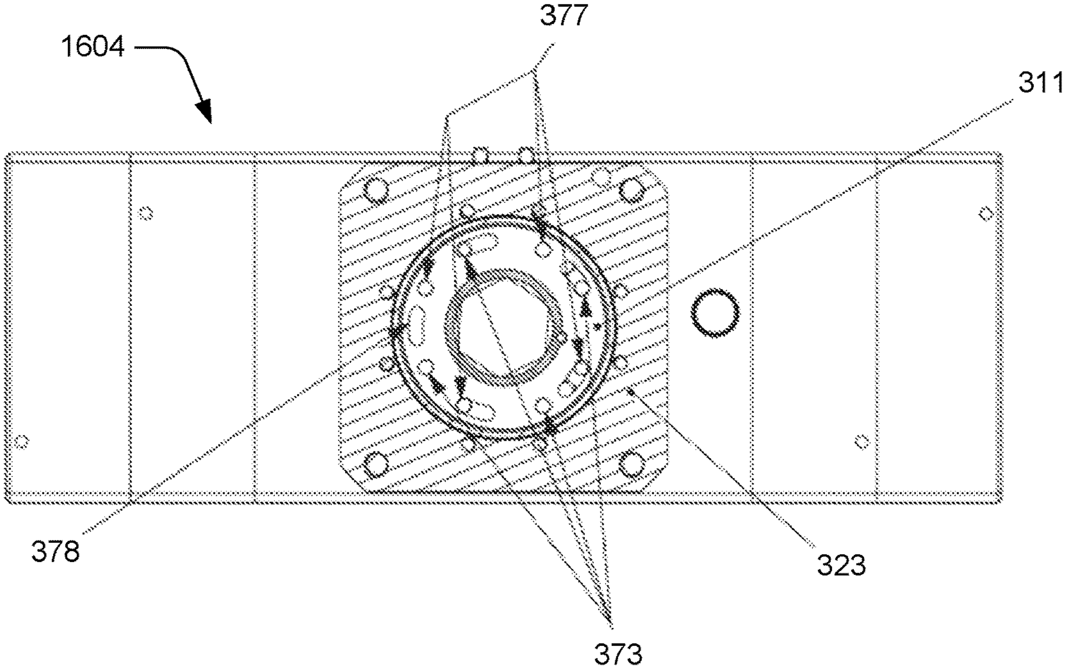

In FIG. 16B, the cross-section view 1604 is illustrated with the front side of the distributor wheel 311 visible. Although distributor cap 312 is not visible in the cross-section view 1604, the locations of the four transfer holes 373 and 377 in distributor cap 312 are shown for explanatory purposes. In one implementation of the assembled rotary actuator 100, the inner face of distributor cap 312 is positioned very closely to the outer face of distributor wheel 311 with a small clearance (e.g., approximately 0.0002") between the two flat face surfaces. In this implementation, the flat back surface of distributor wheel 311 sits against the flat face of the deepest counterbore in distributor block 323 with a small clearance (e.g., approximately 0.0002") between the two flat face surfaces.

FIG. 16B illustrates that when the cam rotor 302 rotates about the central axis 386, the distributor wheel 311 rotates because it is fixed rotationally to the cam rotor 302 with distributor key pin 319. When the distributor wheel 311 rotates, the five equally spaced primary slots 378 pass over the transfer holes 373 and 377, alternately exposing the primary slots 378 to a high pressure and a low pressure precisely timed to the rotation of the cam rotor 302.

View 800-1 of FIG. 8 illustrates the backside of the distributor wheel 311, which includes five equally spaced longer secondary slots 379 centered rotationally about the shorter primary slots 378. The primary slots 378 connect (or break through) to the secondary slots 379 to create a fluid passageway.

Figure 16C:
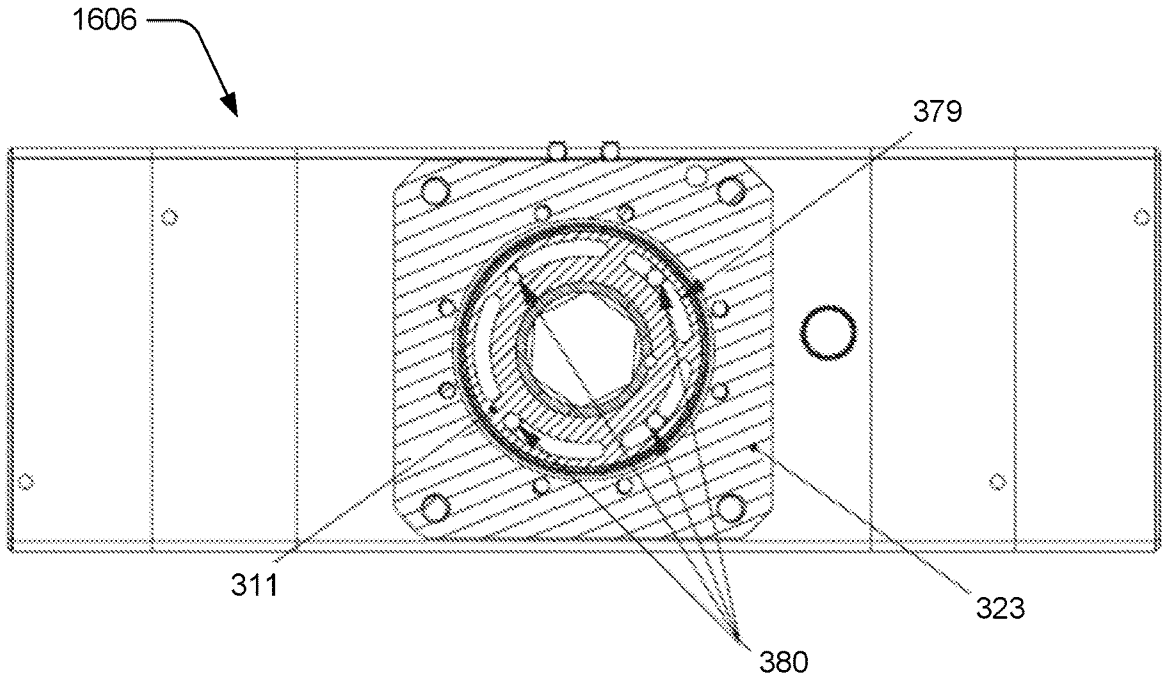

In FIG. 16C, the cross-section view 1606 is illustrated with the longer secondary slots 379 exposed. FIG. 16 C illustrates that as the cam rotor 302 and (hence) the distributor wheel 311 rotate, the slots will alternately expose the four equally-spaced passage holes 380 that are in the counterbore of distributor block 323 to high pressure (e.g., 100 psi) and low pressure (e.g., atmospheric pressure). The timing of the alternating high and low pressures is precisely related to the rotational position of cam rotor 302 and the piston assemblies.

Figure 16D:
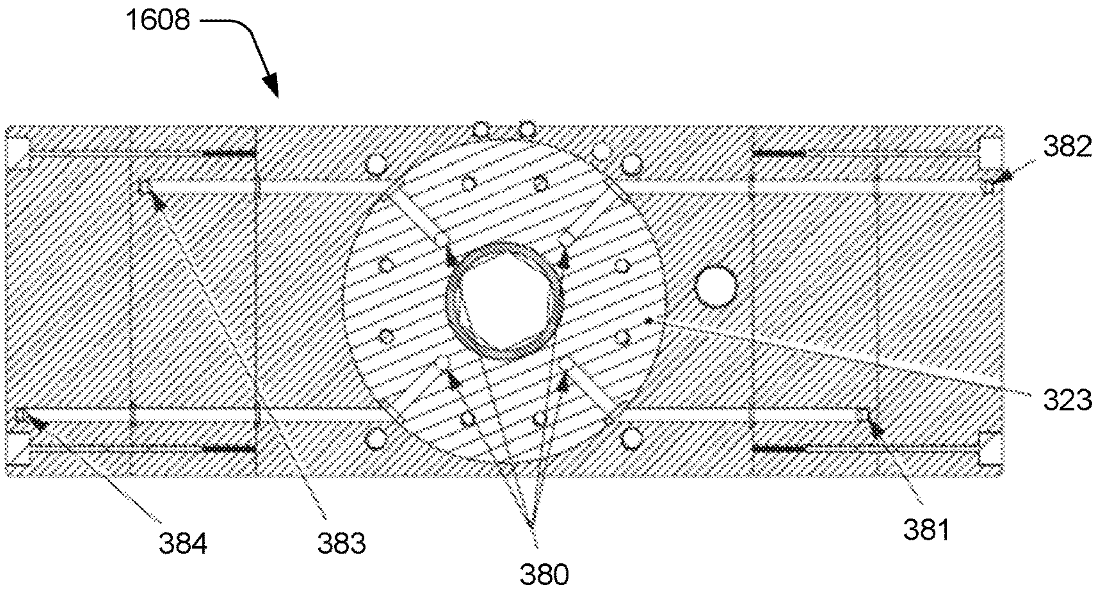

In FIG. 16D, the cross-section view 1608 is illustrated with the distributor block 323 exposed. The passage holes 380 of distributor block 323 intersect with radial side holes that pass through to the outer diameter of its inward-facing cylindrical boss. In this way, the alternating high and low pressures are connected to the first outer pressure chamber 349 via the series of passageway holes 382 in FIG. 16D. Furthermore, the alternating high and low pressures are separately connected to the first inner pressure chamber 363 via the passageway 381, the second outer pressure chamber 357 via the passageway 384, and the second inner pressure chamber 359 via the passageway 383.

The described rotary actuator 100 provides a mechanical method to time and synchronize periods of high and low pressure with rotation of the cam rotor 302. By applying high pressure (e.g., 100 psi) to port 374 and low pressure (e.g., atmospheric pressure) to port 375, the mechanical distribution mechanism precisely applies these high and low pressures to each of the four pressure chambers. The pressure chambers then cause each of the four piston assemblies to either push with force on the lobes on cam rotor 302 for a compression stroke or be pushed back by the lobes on cam rotor 302 for an exhaust stroke. The compression and exhaust strokes create a rotational movement of cam rotor 302 in a clockwise direction 354 with a consistent and large torque (e.g., 50 ft-lbs.). Similarly, if a valve is used to reverse the pressures so low pressure is applied to port 374 and high pressure to port 375, a rotational movement of cam rotor 302 is produced in the opposite or counter-clockwise direction with a large torque.

In this way, the high pressure can be released once the desired rotation or clamping is achieved and the vise remains clamped. As a result, the rotary actuator 100 addresses the problem of pneumatic or hydraulic pressure failure causing workpieces to be released. When the clamp port of the rotary actuator 100 is plumbed to the normally pressurized side of the control valve (e.g., a pressurized port in a valve power-off state), an electrical power-off failure during a manufacturing operation causes the vise fixture to remain clamped. Similarly, if pneumatic pressure is released during the manufacturing process, the workpiece remains clamped due to the non-back-drivable nature of manual leadscrew-operated milling machine vises.

Rotational Distance and Position Sensing and Control

In some implementations, a sensor or sensors (e.g., low-cost magnetic or proximity switches) are installed to provide an electrical signal to a process controller to verify that the correct state (clamped or unclamped) has been achieved. These sensors also enable a process controller to know the precise amount and direction of rotations the rotary actuator 100 has turned the vise lead screw, enabling programmable control of the vise opening over a wide range. For example, an automated process control system uses the sensors to count the direction and number of revolutions of the cam rotor 302 (and hence the vise leadscrew), allowing it to programmatically set the vise opening over a wide range of distances without the need for manual adjustment like other pneumatic and hydraulic systems. The automated opening and closing of the vise is very advantageous for the automation of high-mix and/or low-volume automated machining production.

As illustrated in FIG. 1B, two magnetic sensors 342 are installed in C-shaped slots of the body 301 in one implementation of the rotary actuator 100. In the cross-section view 1300-2 of FIG. 13D, the cylindrical flange of the cam rotor 302 is shown with five cam magnets 338 seated within respective holes. Cam magnets 338 provide or radiate a magnetic field such that as the cam rotor 302 turns, the cam magnets 338 move with it and subject the magnetic sensors 342 to varying magnetic forces. The magnetic sensors 342 include a switch activated when a minimum intensity of a magnetic field is applied to them, causing a digital or analog signal to be output by the sensor. When the magnetic field drops below the intensity threshold, the switch is deactivated, and the signal is turned off.

In one implementation of the rotary actuator 100, the magnetic sensors 342 are arranged in body 301 with a short distance between them. When the cam rotor 302 and cam magnets 338 rotate, the first magnetic sensor 342 (e.g., the left one) activates, followed by the second magnetic sensor 342 (e.g., the right one). Both sensors are activated in the on state and output a digital or analog signal. As rotation continues, the first magnetic sensor 342 deactivates as the cam magnet 338 moves away from it, but the second magnetic sensor 342 remains activated for a short period. If the cam rotor 302 continues to rotate for a full revolution, the process repeats once for each of the five cam magnets 338.

In the described sequence, the two output signals are monitored by an external PLC or robot system. Based on the output signals, the external PLC determines both the direction moved and the number of magnets that passed by the sensors. The PLC can use this information to know the rotational position of the cam rotor 302 within one-fifth of a turn and the rotational direction (clockwise or counterclockwise). For example, if the cam rotor 302 turns in a counterclockwise direction, the right magnetic sensor 342 activates first, then the left magnetic sensor 342 (activating both sensors), then the right one deactivates, and the left one also deactivates. The combination of output signals indicates a movement of one-fifth (based on the number of cam magnets 338) of a turn in the counterclockwise direction of the cam rotor 302. The PLC counts up and down to determine the rotational position of the cam rotor 302 from some known starting point (e.g., zero or closed). Based on the rotational position of the cam rotor 302 and the thread pitch of the lead screw 110, the PLC can determine the lateral position of the vise jaws. In other implementations, the rotary actuator 100 includes fewer or additional cam magnets 338 to decrease or increase, respectively, the resolution of the rotational position of the cam rotor 302.

If the PLC controls a valve that applies high pressure (e.g., 100 psi) to port 374 and low pressure (e.g., atmospheric pressure) to port 375, the PLC can also programmatically control the rotary actuator 100 to rotate a certain number of revolutions in a clockwise direction 354. Similarly, if the PLC also causes the valve to reverse the high and low pressures at ports 374 and 375, it can programmatically control the rotation of the cam rotor 302 for a certain number of revolutions in a counterclockwise direction. Such control of the rotary actuator 100 is possible with pneumatic or fluid valves (e.g., 5/2, 4/2, or 5/3 open center types).

Manufacturing and Assembly Techniques

The components of the rotary actuator 100 may be machined, cast, formed, or otherwise manufactured from various composites, metals, or materials. Many components are standard items and may be purchased from supply houses.

Assembly of the rotary actuator 100 is also relatively simple. It is noted that the sliding and bearing surfaces may be lightly greased during assembly. A sleeve bearing 303 is pressed into each of the two large end holes in each of the two end faces of body 301, with their curved inner surfaces pointing inward towards each other and these curved surfaces concentric to the central axis 386. Two o-rings 326 are installed into the internal annular grooves in the through hole in the back face of body 301 concentric to the central axis 386. Fluid fitting 339 is threaded into the threaded hole on the front face of body 301. Needle bearing 321 is pressed into the deepest counterbore in the front face of body 301 until seated. The five cam magnets 338 are inserted into the five counterbored holes in the face of the largest diameter of the cam rotor 302 and held in place by magnetic force.

Cam rotor 302 is placed into the center of needle bearing 321 until it stops on the face. Needle bearing 322 is pressed into the counterbore in the end face of the cylindrical boss of distributor block 323 until seated. Pin 317 is pressed into the hole alongside the cylindrical boss of distributor block 323. Two fluid fittings 325 are threaded into the holes in the side of distributor block 323. One o-ring 318 is installed in the internal annular groove in the through hole of distributor block 323. O-ring 320 is installed in the face groove in the end face of the cylindrical boss of distributor block 323. An o-ring 324 is installed in each of the four counterbored air passage holes arranged radially about the center axis of the through hole of distributor block 323. The distributor block 323 is installed into body 301 until it sits with the face of its square flange against the front face of body 301 and the internal surfaces of the needle bearing 322 surround the outer cylindrical surface of the cam rotor 302. Screws 332 are inserted through the counterbored holes in the face of distributor block 323 and threaded in place into holes in the front face of body 301.

Distributor key pin 319 is inserted in the round half-circle groove in the outer cylindrical surface of cam rotor 302. Distributor wheel 311 is slid onto the outer cylindrical boss surface of cam rotor 302 with its small half-circle keyway cut aligned with the keyway cut in the cylindrical outer surface of cam rotor 302 until it seats on the deeper counterbore flat face in the square face of distributor block 323. Two o-rings 313 are installed in two of the outer annular grooves in distributor cap 312 with one empty groove in between them. Two o-rings 318 are installed in the inner annular grooves of distributor cap 312. O-ring 314 is installed in the face groove at the bottom of the largest counterbore in distributor block 323. Distributor cap 312 is installed into the largest counterbored hole in distributor block 323 until the end of it coincides with the bottom face of the largest counterbore in distributor block 323, and it is radially aligned (clocked) such that the scribe line on its outer face is aligned with the scribe line on the front face of distributor block 323. Screws 316 are placed into each of the eight countersunk through holes in distributor cap 312 and threaded into the holes in the bottom of the largest counterbore of distributor block 323.

Hex adapter 310 is inserted into the hex-shaped hole at the end of cam rotor 302. Retaining ring 341 is squeezed and pushed into the counterbored hole at the end of the cam rotor 302 until it expands into the groove to retain the hex adapter 310. A ring magnet 334 is placed into each of the two counterbores in the back face of body 301 and secured in place with two screws 335.

Each inner piston assembly 343 is made by inserting a full-complement needle bearing 307 into the inner diameter of the piston roller 305. The piston roller 305 is then placed into the rectangular pocket at the end of the inner piston rod 304, and pin 306 is pressed through the two holes in the side of the inner piston rod 304 and through the inner diameter of the full-complement needle bearing 307, fixing it in place except rotationally. Two pins 317 are pressed into the dowel holes at the end of the inner piston rod 304, and inner piston 309 is pushed onto the end of the inner piston rod 304, being located precisely about the pins 317. Screws 340 are threaded into the tapped holes at the end of the inner piston rod 304 until their heads sit securely on the bottom face of the counterbores in inner piston 309, securing it to the inner piston rod 304. The piston seal is stretched around the perimeter of the inner piston 309 and seated in place in the deeper of its two outer perimeter grooves. Piston slider 328 is wrapped around the outside of inner piston 309 until it seats into the shallower of the two perimeter grooves in inner piston 309. Piston rod seal 330 is pushed into the internal annular groove of the largest through hole in inner piston 309.

Each inner chamber housing assembly 344 is made by pressing a sealing ball 337 into the side hole of the air passage hole in the inner chamber housing 308 until the outer surface of the ball is tangent to its outer surface. Two pins 317 are pressed into the dowel holes in the face of inner chamber housing 308 that contains the rounded square pocket. O-ring seal 329 is stretched into the face groove in inner chamber housing 308. Piston rod seal 330 is pushed into the internal annular groove of the largest through hole in inner chamber housing 308. O-ring 315 is placed into the small counterbored hole in the face of inner chamber housing 308 opposite the rounded square pocket.

Each outer piston assembly 345 is made by inserting a full-complement needle bearing 307 into the inner diameter of the piston roller 305. The piston roller 305 is then placed into the rectangular pocket at the end of the outer piston rod 385, and pin 306 is pressed through the two holes in the side of the outer piston rod 385 and through the inner diameter of the full-complement needle bearing 307, fixing it in place except rotationally. Two pins 317 are pressed into the dowel holes at the end of outer piston rod 385 then outer piston 348 is pushed onto the end of outer piston rod 385, where it locates precisely about the pins 317. Screws 340 are threaded into the tapped holes at the end of the outer piston rod 385 until their heads sit securely on the bottom face of the counterbores in outer piston 348, securing it to the outer piston rod 385. The piston seal is stretched around the perimeter of the outer piston 348 and seated in place in the deeper of its two outer perimeter grooves. Piston slider 328 is wrapped around the outside of outer piston 348 until it seats into the shallower of the two perimeter grooves in outer piston 348.

Each outer chamber housing assembly 346 is made by pressing a sealing ball 337 into the side hole of the air passage hole in the outer chamber housing 387 until the outer surface of the ball is tangent to its outer surface. Two pins 317 are pressed into the dowel holes in the face of the outer chamber housing 387 that contains the rounded square pocket. O-ring seal 329 is stretched into the face groove in the outer chamber housing 387.

Each inner piston assembly 343 is inserted piston-end first into the rounded square pocket of an inner chamber housing assembly 344. This assembly is then installed on body 301 by pushing the piston-end first into the inner diameter of the sleeve bearing 303, which is located nearest the back face of body 301 until the face of the inner chamber housing assembly 344 contacts the right end face of body 301 with the pins 317 locating in the dowel holes.

Each outer piston assembly 345 is inserted piston-end first into the rounded square pocket of an outer chamber housing assembly 346. This assembly is then installed on body 301 by pushing the piston-end first through the largest thru-hole in the inner chamber housing assembly 344 and inner piston assembly 343 into the inner diameter of the sleeve bearing 303 that is located near the front face of body 301 until the face of the outer chamber housing assembly 346 contacts the face of the inner chamber housing assembly 344 with the pins 317 locating in the dowel holes. Four screws 331 are pushed through the screw clearance holes in the outer chamber housing assembly 346 and the inner chamber housing assembly 344 and threaded securely into the right end of body 301.

Each corner block 333 is placed with its protruding rib into the face slot of an outer chamber housing assembly 346 with the short side of its L-shape pointing towards the body 301. The corner block 333 is fastened in place with two screws 336.

Each magnetic sensor 342 is slid into one of the C-shaped slots in the top face of body 301 until approximately a median position in body 301 is reached. Both magnetic sensors 342 are secured in place by lightly tightening their set screws until contact with the bottom of the C-shaped slots is achieved, thus locking them in place.

ADDITIONAL IMPLEMENTATIONS

Each component identified in the described example of the rotary actuator 100 is not necessary in each implementation. For example, the magnetic sensors 342, cam magnets 338, and some of the bearings, bushings, and/or seals are not strictly necessary for the device to function. Instead of two magnetic sensors 342, a single magnetic sensor 342 and a state of a fluid control valve can be used to measure the rotational position and direction of the cam rotor 302 in another implementation. In lieu of electromechanical pneumatic valves, the rotary actuator 100 can use alternate controlling means, including various fluid mediums.

In other implementations, the rotary actuator 100 is reconfigured in many ways, such as by changing the shape of the rounded square-shaped pockets or "bores" to circular, square, or other polygonal shapes. The piston sliders 328 can be eliminated and made an integral part of the piston. Different materials, bearings, and sealing methods can be employed in other implementations. The ring magnets 334 and corner blocks 333 can be altered or eliminated in favor of other methods of securing the rotary actuator 100 to a milling machine or other vise fixture. The number of cam lobes on the cam rotor 302 or the number of pistons pushing on the cam lobes can be changed while producing the same functionality and not departing from the spirit of the described rotary actuator.

The rotary actuator 100 can also be placed in different arrangements relative to the vise 102 and/or the lead screw 110. For example, the rotary actuator 100 can be located above or below a portion of the lead screw 110. In this implementation, a chain drive, rotary vein mechanism, or similar mechanism is connected to an adapter on the lead screw and a portion of the cam rotor assembly to actuate the lead screw 110. As the cam rotor assembly rotates, the chain drive cause the lead screw 110 also to rotate.

The rotary actuator 100 can also be applied or reconfigured for other fields and applications beyond lead-screw vises and milling machines without departing from the mechanisms and principles described in this document. For example, the rotary actuator 100 can actuate other fixture types besides traditional milling machine vises to drive rotary mechanisms. The mechanism in which the outer piston rods 85 push through the inner pistons 309 can also be applied to various pneumatic and hydraulic piston-operated actuators where compact size and high force are required. Additionally, the rotary actuator 100 is advantageous for applications where a high-torque pneumatic motor is desirable, especially where a compact size and a through hole through the center axis are required. This through hole may be useful in allowing cables or tubing to pass through the motor.

In some aspects, the systems described herein include a rotary actuator for controlling a lead screw of a clamping system, the rotary actuator including an adapter shaped and contoured to engage an end of the lead screw of the clamping system, a body with a hole or through hole on a front portion and at least one hole on each side, a cam rotor with a cylindrical body, a first cam lobe profile, and a second cam lobe profile, the cam rotor being positioned inside the through hole of the body, each cam lobe profile including multiple cam lobes and being concentric with the cylindrical body, the first cam lobe profile and the second cam lobe profile having a same design and being rotationally offset from each other in a longitudinal direction along a center axis of the cam rotor, an end of the cam rotor configured to retain the adapter, and multiple piston assemblies configured to rotate the cam rotor as high pressure and low pressure are alternatingly applied via a fluid to piston chambers associated with the multiple piston assemblies, a first piston assembly of the multiple piston assemblies being arranged in contact with the multiple cam lobes of the first cam lobe profile, a second piston assembly of the multiple piston assemblies being arranged in contact with the multiple cam lobes of the second cam lobe profile, the multiple piston assemblies being positioned inside a corresponding side hole of the multiple side holes of the body.

In some aspects, the systems described herein include a rotary actuator where the cam rotor includes a through hole along a longitudinal axis of the cam rotor.

In some aspects, the systems described herein include a rotary actuator where the rotary actuator includes four piston assemblies with a first piston assembly and a second piston assembly arranged on a first side end of the body and a third piston assembly and a fourth piston assembly arranged on a second side end of the body, the first piston assembly and the third piston assembly in contact with the first cam lobe profile, the second piston assembly and the fourth piston assembly in contact with the second cam lobe profile, the first piston assembly is configured to move in an inward direction in response to a first pressure being applied to a first pressure chamber associated with the first piston assembly and a second pressure being applied to a first vented chamber associated with the first piston assembly at a first time, the first pressure being larger than the second pressure, movement of the first piston assembly in the inward direction causing the first cam lobe profile and the cam rotor to rotate in a clockwise direction, the third piston assembly is configured to move in an outward direction in response to rotation of the first cam lobe profile and the second pressure being applied to a third pressure chamber and a third vented chamber associated with the third piston assembly at the first time, the fourth piston assembly is configured to move in the inward direction in response to the first pressure being applied to a fourth pressure chamber associated with the fourth piston assembly and the second pressure being applied to a fourth vented chamber associated with the fourth piston assembly at the first time, movement of the fourth piston assembly in the inward direction causing the second cam lobe profile and the cam rotor to rotate in the clockwise direction, and the second piston assembly is configured to move in the outward direction in response to rotation of the second cam lobe profile and the second pressure being applied to a second pressure chamber and a second vented chamber associated with the second piston assembly at the first time.

In some aspects, the systems described herein include a rotary actuator where the first pressure is greater than 15 psi and less than 200 psi and the second pressure is equal to atmospheric pressure.

In some aspects, the systems described herein include a rotary actuator where the third piston assembly is configured to move in the inward direction in response to the first pressure being applied to the third pressure chamber and the second pressure being applied to the third vented chamber at a second time, movement of the third piston assembly in the inward direction causing the first cam lobe profile and the cam rotor to rotate in the clockwise direction, the first piston assembly is configured to move in the outward direction in response to rotation of the first cam lobe profile and the second pressure being applied to the first pressure chamber and the first vented chamber at the second time, the second piston assembly is configured to move in the inward direction in response to the first pressure being applied to the second pressure chamber and the second pressure being applied to the second vented chamber at the second time, movement of the second piston assembly in the inward direction causing the second cam lobe profile and the cam rotor to rotate in the clockwise direction, and the fourth piston assembly is configured to move in the outward direction in response to rotation of the second cam lobe profile and the second pressure being applied to the fourth pressure chamber and the fourth vented chamber at the second time.

In some aspects, the systems described herein include a rotary actuator where a rotation amount and a rotation direction of the cam rotor is controlled by a programmable logic controller, a processor, or a computer system.

In some aspects, the systems described herein include a rotary actuator where the rotary actuator further comprises a distributor wheel that includes: a cylindrical body with a center hole sized to fit around the cylindrical body of the cam rotor and configured to be rotationally fixed in relation to the cam rotor, multiple curved primary slots that pass through a height of the distributor wheel, the multiple curved primary slots being concentric to a center axis of the distributor wheel and equally-spaced around the center axis on a first face of the distributor wheel, and multiple curved secondary slots on a second face of the distributor wheel and centered rotationally about the multiple curved primary slots, the multiple curved secondary slots being longer than the multiple curved primary slots, the multiple curved secondary slots having a depth that is smaller than a height of the distributor wheel.

In some aspects, the systems described herein include a rotary actuator where the rotary actuator also includes a distributor cap that includes a cylindrical body with a center hole sized to fit around the cylindrical body of the cam rotor, eight face holes in a face of the distributor cap and perpendicular to the face of the distributor cap, the face of the distributor cap being positioned in close proximity to the first face of the distributor wheel, two annular grooves on an outside surface of the cylindrical body configured to serve as internal passages, a first annular groove of the two annular grooves being operatively connected to a first fluid fitting on an exterior of the rotary actuator, a second annular groove of the two annular grooves being operatively connected to a second fluid fitting on the exterior of the rotary actuator, four first annular holes in the first annular groove and perpendicular to a center axis of the cylindrical body, each of the four first annular holes operatively connected to one face hole of the eight face holes, and four second annular holes in the second annular groove and perpendicular to the center axis of the cylindrical body, each of the four second annular holes operatively connected to one face hole of the eight face holes, each face hole being operatively connected to an annular hole.

In some aspects, the systems described herein include a rotary actuator where the rotary actuator also includes a distributor block including a cuboid body with a through hole, a center axis of the through hole of the cuboid body being coincident with the center axis of the cam rotor, a cylinder protruding from a first flat surface of the cuboid body and concentric to the through hole of the cuboid body, a first set of four holes in an outer surface of the cylinder arrayed evenly spaced about the center axis, a first circular counterbore and a second circular counterbore into a second flat surface of cuboid body opposite the first flat surface of the cuboid body, two fitting holes in a flat side face of the cuboid body into which the first fluid fitting and the second fluid fitting are installed, each fitting hole having one or more passage holes in a bottom of the fitting hole extending to the first circular counterbore, the one or more passage holes in the two fitting holes offset relative to one another along the center axis, and a second set of four holes in a flat surface of the second circular counterbore arrayed evenly spaced about the center axis and parallel to the center axis, the second set of four holes being perpendicular to the first set of four holes, each hole of the second set of four holes intersecting a corresponding hole of the first set of four holes, the flat surface of the second circular counterbore being positioned in close proximity to a second face of the distributor wheel opposite the first face of the distributor wheel.

In some aspects, the systems described herein include a rotary actuator where, in response to the first pressure being applied to the first fluid fitting at the first time, the first pressure is transferred from the first fluid fitting through the one or more passage holes in the bottom of a corresponding fitting hole of the distributor block into the first annular groove of the distributor cap, from the first annular groove through each of the four first annular holes to a corresponding face hole in the face of the distributor cap, from the eight face holes of the distributor cap to one or more curved primary slots of the distributor wheel as the cam rotor rotates, from the one or more curved primary slots to one or more corresponding curved secondary slots of the distributor wheel, from the one or more curved secondary slots of the distributor wheel to one or more corresponding holes of the second set of four holes of the distributor block, from the one or more holes of the second set of four holes of the distributor block to a corresponding intersecting hole of the first set of four holes of the distributor block, and from the one or more holes of the first set of four holes of the distributor block to the first pressure chamber associated with the first piston assembly via a series of first passageway holes and the fourth pressure chamber associated with the fourth piston assembly via a series of fourth passageway holes.

In some aspects, the systems described herein include a rotary actuator where the first piston assembly and the second piston assembly are arranged as a stacked-piston assembly with a piston rod of the first piston assembly passing through a hole in a flat face of a piston of the second piston assembly, the piston rod of the first piston assembly being offset from a piston rod of the second piston assembly in the longitudinal direction, and the third piston assembly and the fourth piston assembly are arranged as another stacked-piston assembly with a piston rod of the third piston assembly passing through a hole in a flat face of a piston of the fourth piston assembly, the piston rod of the third piston assembly being offset from a piston rod of the fourth piston assembly in the longitudinal direction.

In some aspects, the systems described herein include a rotary actuator where the rotary actuator is configured to maintain a clamping force of the clamping system in response to a pneumatic or hydraulic failure in association with the fluid.

In some aspects, the systems described herein include a rotary actuator where the rotary actuator also includes at least one corner block attached to the rotary actuator and configured to hold the rotary actuator in rotational place relative to the clamping system and at least one magnet configured to hold the rotary actuator in place along a longitudinal axis of the lead screw relative to the clamping system.

In some aspects, the systems described herein include a rotary actuator where the fluid comprises air or a liquid.

In some aspects, the systems described herein include a rotary actuator where the rotary actuator also includes at least one cam magnet positioned on a cam lobe of the first cam lobe profile or the second cam lobe profile or in between cam lobes of the first cam lobe profile or the second cam lobe profile, and at least one magnetic sensor positioned in or on a portion of the rotary actuator, the at least one magnetic sensor configured to output a signal in response to the at least one cam magnet rotating into a position near the at least one magnetic sensor.

In some aspects, the systems described herein include a rotary actuator where the rotary actuator also includes multiple cam magnets and two magnetic sensors, each magnetic sensor configured to output the signal in response to a cam magnet of the multiple cam magnets rotating into the position near the respective magnetic sensor, a combined signal output of the two magnetic sensors indicating a rotational position or amount of rotation of the cam rotor and a rotational direction of the cam rotor.

In some aspects, the systems described herein include a rotary actuator where the rotary actuator also includes multiple cam magnets and one magnetic sensor, the output signal of the one magnetic sensor indicating a rotational position or amount of rotation of the cam rotor.

In some aspects, the systems described herein include a rotary actuator where the first cam lobe profile and the second cam lobe profile have a star shape with N cam lobes, N being a positive and odd integer greater than or equal to three, and a rotational offset between the first cam lobe profile and the second cam lobe profile is equal to ninety (90) divided by N (90/N) degrees.

In some aspects, the systems described herein include a rotary actuator where N equals five (5) and the rotational offset is equal to eighteen (18) degrees.

In some aspects, the systems described herein include a rotary actuator where the adapter has a hexagonal shape to match a hexagonal shape of the lead screw.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A rotary actuator for controlling a lead screw of a clamping system, the rotary actuator comprising:

an adapter shaped and contoured to engage an end of the lead screw of the clamping system;

a body with a hole or through hole on a front portion and at least one hole on each side;

a cam rotor with a cylindrical body, a first cam lobe profile, and a second cam lobe profile, the cam rotor being positioned inside the hole or through hole on the front portion of the body, each cam lobe profile including multiple cam lobes and being concentric with the cylindrical body, the first cam lobe profile and the second cam lobe profile having a same design and being rotationally offset from each other and longitudinally offset in a longitudinal direction along a center axis of the cam rotor, the first cam lobe profile and the second cam lobe profile having a star shape with N cam lobes, N being a positive and odd integer greater than or equal to three, a rotational offset between the first cam lobe profile and the second cam lobe profile being equal to ninety (90) divided by N (90/N) degrees, an end of the cam rotor configured to retain the adapter; and multiple piston assemblies configured to rotate the cam rotor as high pressure and low pressure are alternatingly applied via a fluid to piston chambers associated with the multiple piston assemblies, a first piston assembly of the multiple piston assemblies being arranged in contact with the multiple cam lobes of the first cam lobe profile, a second piston assembly of the multiple piston assemblies being arranged in contact with the multiple cam lobes of the second cam lobe profile, the multiple piston assemblies being positioned inside a corresponding side hole of multiple side holes of the body.

2. The rotary actuator of claim 1, wherein the cam rotor includes a through hole along a longitudinal axis of the cam rotor.

3. The rotary actuator of claim 1, wherein:

the rotary actuator includes four piston assemblies with a first piston assembly and a second piston assembly arranged on a first side end of the body and a third piston assembly and a fourth piston assembly arranged on a second side end of the body;

the first piston assembly and the third piston assembly in contact with the first cam lobe profile;

the second piston assembly and the fourth piston assembly in contact with the second cam lobe profile;

the first piston assembly is configured to move in an inward direction in response to a first pressure being applied to a first pressure chamber associated with the first piston assembly and a second pressure being applied to a first vented chamber associated with the first piston assembly at a first time, the first pressure being larger than the second pressure, movement of the first piston assembly in the inward direction causing the first cam lobe profile and the cam rotor to rotate in a clockwise direction;

the third piston assembly is configured to move in an outward direction in response to rotation of the first cam lobe profile and the second pressure being applied to a third pressure chamber and a third vented chamber associated with the third piston assembly at the first time;

the fourth piston assembly is configured to move in the inward direction in response to the first pressure being applied to a fourth pressure chamber associated with the fourth piston assembly and the second pressure being applied to a fourth vented chamber associated with the fourth piston assembly at the first time, movement of the fourth piston assembly in the inward direction causing the second cam lobe profile and the cam rotor to rotate in the clockwise direction; and the second piston assembly is configured to move in the outward direction in response to rotation of the second cam lobe profile and the second pressure being applied to a second pressure chamber and a second vented chamber associated with the second piston assembly at the first time.

4. The rotary actuator of claim 3, wherein:

the first pressure is greater than 15 psi and less than 200 psi; and the second pressure is equal to atmospheric pressure.

5. The rotary actuator of claim 3, wherein:

the third piston assembly is configured to move in the inward direction in response to the first pressure being applied to the third pressure chamber and the second pressure being applied to the third vented chamber at a second time, movement of the third piston assembly in the inward direction causing the first cam lobe profile and the cam rotor to rotate in the clockwise direction;

the first piston assembly is configured to move in the outward direction in response to rotation of the first cam lobe profile and the second pressure being applied to the first pressure chamber and the first vented chamber at the second time;

the second piston assembly is configured to move in the inward direction in response to the first pressure being applied to the second pressure chamber and the second pressure being applied to the second vented chamber at the second time, movement of the second piston assembly in the inward direction causing the second cam lobe profile and the cam rotor to rotate in the clockwise direction; and the fourth piston assembly is configured to move in the outward direction in response to rotation of the second cam lobe profile and the second pressure being applied to the fourth pressure chamber and the fourth vented chamber at the second time.

6. The rotary actuator of claim 5, wherein a rotation amount and a rotation direction of the cam rotor is controlled by a programmable logic controller, a processor, or a computer system.

7. The rotary actuator of claim 5, wherein the rotary actuator further comprises a distributor wheel that includes:

a cylindrical body with a center hole sized to fit around the cylindrical body of the cam rotor and configured to be rotationally fixed in relation to the cam rotor;

multiple curved primary slots that pass through a height of the distributor wheel, the multiple curved primary slots being concentric to a center axis of the distributor wheel and equally-spaced around the center axis on a first face of the distributor wheel; and multiple curved secondary slots on a second face of the distributor wheel and centered rotationally about the multiple curved primary slots, the multiple curved secondary slots being longer than the multiple curved primary slots, the multiple curved secondary slots having a depth that is smaller than a height of the distributor wheel.

8. The rotary actuator of claim 7, wherein the rotary actuator further comprises a distributor cap that includes:

a cylindrical body with a center hole sized to fit around the cylindrical body of the cam rotor;

eight face holes in a face of the distributor cap and perpendicular to the face of the distributor cap, the face of the distributor cap being positioned in close proximity to the first face of the distributor wheel;

two annular grooves on an outside surface of the cylindrical body configured to serve as internal passages, a first annular groove of the two annular grooves being operatively connected to a first fluid fitting on an exterior of the rotary actuator, a second annular groove of the two annular grooves being operatively connected to a second fluid fitting on the exterior of the rotary actuator;

four first annular holes in the first annular groove and perpendicular to a center axis of the cylindrical body, each of the four first annular holes operatively connected to one face hole of the eight face holes; and four second annular holes in the second annular groove and perpendicular to the center axis of the cylindrical body, each of the four second annular holes operatively connected to one face hole of the eight face holes, each face hole being operatively connected to an annular hole.

9. The rotary actuator of claim 8, wherein the rotary actuator further comprises a distributor block including:

a cuboid body with a through hole, a center axis of the through hole of the cuboid body being coincident with the center axis of the cam rotor;

a cylinder protruding from a first flat surface of the cuboid body and concentric to the through hole of the cuboid body, a first set of four holes in an outer surface of the cylinder arrayed evenly spaced about the center axis of the through hole of the cuboid body;

a first circular counterbore and a second circular counterbore into a second flat surface of cuboid body opposite the first flat surface of the cuboid body;

two fitting holes in a flat side face of the cuboid body into which the first fluid fitting and the second fluid fitting are installed, each fitting hole having one or more passage holes in a bottom of the fitting hole extending to the first circular counterbore, the one or more passage holes in the two fitting holes offset relative to one another along the center axis of the through hole of the cuboid body; and a second set of four holes in a flat surface of the second circular counterbore arrayed evenly spaced about the center axis of the through hole of the cuboid body and parallel to the center axis of the through hole of the cuboid body, the second set of four holes being perpendicular to the first set of four holes, each hole of the second set of four holes intersecting a corresponding hole of the first set of four holes, the flat surface of the second circular counterbore being positioned in close proximity to a second face of the distributor wheel opposite the first face of the distributor wheel.

10. The rotary actuator of claim 9, wherein, in response to the first pressure being applied to the first fluid fitting at the first time, the first pressure is transferred:

from the first fluid fitting through the one or more passage holes in the bottom of a corresponding fitting hole of the distributor block into the first annular groove of the distributor cap;

from the first annular groove through each of the four first annular holes to a corresponding face hole in the face of the distributor cap;

from the eight face holes of the distributor cap to one or more curved primary slots of the distributor wheel as the cam rotor rotates;

from the one or more curved primary slots to one or more corresponding curved secondary slots of the distributor wheel;

from the one or more curved secondary slots of the distributor wheel to one or more corresponding holes of the second set of four holes of the distributor block;

from the one or more holes of the second set of four holes of the distributor block to a corresponding intersecting hole of the first set of four holes of the distributor block; and from the one or more holes of the first set of four holes of the distributor block to the first pressure chamber associated with the first piston assembly via a series of first passageway holes and the fourth pressure chamber associated with the fourth piston assembly via a series of fourth passageway holes.

11. The rotary actuator of claim 7, wherein the multiple curved primary slots and the multiple curved secondary slots of the distributor wheel are configured to open and close fluid passages of the rotary actuator without a flexible sliding seal, the distributor wheel and one or more surfaces adjacent to the distributor wheel comprising metal parts having a hard, low-friction coating and being arranged in close clearance to one another to form a dynamic dry seal therebetween.

12. The rotary actuator of claim 3, wherein:

the first piston assembly and the second piston assembly are arranged as a stacked-piston assembly with a piston rod of the first piston assembly passing through a hole in a flat face of a piston of the second piston assembly, the piston rod of the first piston assembly being offset from a piston rod of the second piston assembly in the longitudinal direction; and the third piston assembly and the fourth piston assembly are arranged as another stacked-piston assembly with a piston rod of the third piston assembly passing through a hole in a flat face of a piston of the fourth piston assembly, the piston rod of the third piston assembly being offset from a piston rod of the fourth piston assembly in the longitudinal direction.

13. The rotary actuator of claim 1, wherein the rotary actuator is configured to maintain a clamping force of the clamping system in response to a pneumatic or hydraulic failure in association with the fluid.

14. The rotary actuator of claim 1, wherein the rotary actuator further comprises:

at least one corner block attached to the rotary actuator and configured to hold the rotary actuator in rotational place relative to the clamping system; and at least one magnet configured to hold the rotary actuator in place along a longitudinal axis of the lead screw relative to the clamping system.

15. The rotary actuator of claim 1, wherein the fluid comprises air or a liquid.

16. The rotary actuator of claim 1, wherein the rotary actuator further comprises:

at least one cam magnet positioned on a cam lobe of the first cam lobe profile or the second cam lobe profile or in between cam lobes of the first cam lobe profile or the second cam lobe profile; and at least one magnetic sensor positioned in or on a portion of the rotary actuator, the at least one magnetic sensor configured to output a signal in response to the at least one cam magnet rotating into a position near the at least one magnetic sensor.

17. The rotary actuator of claim 16, wherein the rotary actuator further comprises:

multiple cam magnets; and two magnetic sensors, each magnetic sensor configured to output the signal in response to a cam magnet of the multiple cam magnets rotating into the position near the respective magnetic sensor, a combined signal output of the two magnetic sensors indicating a rotational position or amount of rotation of the cam rotor and a rotational direction of the cam rotor.

18. The rotary actuator of claim 16, wherein the rotary actuator further comprises:

multiple cam magnets; and one magnetic sensor, the output signal of the one magnetic sensor indicating a rotational position or amount of rotation of the cam rotor.

19. The rotary actuator of claim 1, wherein:

N equals five (5); and the rotational offset is equal to eighteen (18) degrees.

20. The rotary actuator of claim 1, wherein the adapter has a hexagonal shape to match a hexagonal shape of the lead screw.

* * * * *